US007008979B2

(12) United States Patent
Schottman et al.

(10) Patent No.: US 7,008,979 B2
(45) Date of Patent: Mar. 7, 2006

(54) COATING COMPOSITION FOR MULTIPLE HYDROPHILIC APPLICATIONS

(75) Inventors: Thomas C. Schottman, Flemington, NJ (US); Patrick M. Hennessey, Fords, NJ (US); Rainer Gruening, Basking Ridge, NJ (US)

(73) Assignee: Hydromer, Inc., Branchburg, NJ (US)

( * ) Notice: Subject to any disclaimer, the term of this patent is extended or adjusted under 35 U.S.C. 154(b) by 0 days.

(21) Appl. No.: 10/260,823

(22) Filed: Sep. 27, 2002

(65) Prior Publication Data

US 2003/0203991 A1 Oct. 30, 2003

Related U.S. Application Data

(60) Provisional application No. 60/376,983, filed on Apr. 30, 2002.

(51) Int. Cl.

| | |
|---|---|
| ***C08J 3/215*** | (2006.01) |
| ***A61M 25/00*** | (2006.01) |
| ***C08K 3/22*** | (2006.01) |
| ***C08L 75/00*** | (2006.01) |
| ***C08L 39/06*** | (2006.01) |

(52) U.S. Cl. ...................... 523/334; 524/430; 524/502; 524/507; 428/411.1; 604/264

(58) Field of Classification Search ................ 523/334; 524/430, 431, 492, 502, 503, 507, 513, 522; 428/32.34, 32.38, 195.1, 32.3; 604/264
See application file for complete search history.

(56) References Cited

U.S. PATENT DOCUMENTS

| | | | |
|---|---|---|---|
| 3,939,260 | A | 2/1976 | Lafon |
| 3,946,061 | A | 3/1976 | Buckman et al. |
| 3,955,997 | A | 5/1976 | Sagane et al. |
| 3,972,995 | A | 8/1976 | Tsuk et al. |
| 3,982,544 | A | 9/1976 | Dyck |
| 4,060,508 | A | 11/1977 | Sugahara et al. |
| 4,080,476 | A | 3/1978 | Laskey |
| 4,100,309 | A | 7/1978 | Micklus et al. |
| 4,119,094 | A | 10/1978 | Micklus et al. |
| 4,156,040 | A | 5/1979 | Swider et al. |
| 4,181,528 | A | 1/1980 | Work, III et al. |
| 4,239,664 | A | 12/1980 | Teng et al. |
| 4,241,169 | A | 12/1980 | Work, III et al. |
| 4,250,131 | A | 2/1981 | Sobel et al. |
| 4,252,663 | A | 2/1981 | Eriksson |
| 4,342,764 | A | 8/1982 | Ilvespää et al. |
| 4,373,009 | A | 2/1983 | Winn |
| 4,459,317 | A | 7/1984 | Lambert |
| 4,467,073 | A | 8/1984 | Creasy |
| 4,487,808 | A | 12/1984 | Lambert |
| 4,500,373 | A | 2/1985 | Kubota |
| 4,515,593 | A | 5/1985 | Norton |
| 4,518,685 | A | 5/1985 | Yagihara et al. |
| 4,550,126 | A | 10/1985 | Lorenz |
| 4,576,156 | A | 3/1986 | Dyck et al. |
| 4,642,267 | A | 2/1987 | Creasy et al. |
| 4,729,914 | A | 3/1988 | Kliment et al. |
| 4,747,346 | A | 5/1988 | Geel |
| 4,762,892 | A | 8/1988 | Koch et al. |
| 4,769,013 | A | 9/1988 | Lorenz et al. |
| 4,781,978 | A | 11/1988 | Duan |
| 4,789,720 | A | 12/1988 | Teffenhart |
| 4,810,543 | A | 3/1989 | Gould et al. |
| 4,812,316 | A | 3/1989 | Rossi et al. |
| 4,844,902 | A | 7/1989 | Grohe |
| 4,847,324 | A | 7/1989 | Creasy |
| 4,849,286 | A | 7/1989 | Milne |
| 4,851,439 | A | 7/1989 | Speiser et al. |
| 4,865,842 | A | 9/1989 | Bradbury et al. |
| 4,875,287 | A | 10/1989 | Creasy et al. |
| 4,880,726 | A | 11/1989 | Shiba et al. |
| 4,900,795 | A | 2/1990 | Hoffmann et al. |
| 4,943,460 | A | 7/1990 | Markle et al. |
| 4,962,080 | A | 10/1990 | Watanabe |
| 4,977,181 | A | 12/1990 | Walker |
| 4,980,231 | A | 12/1990 | Baker et al. |
| 4,987,182 | A | 1/1991 | Creasy |
| 4,990,357 | A | 2/1991 | Karakelle et al. |
| 4,990,486 | A | 2/1991 | Kamosaki et al. |
| 5,001,009 | A | 3/1991 | Whitbourne |
| 5,002,825 | A | 3/1991 | Mimura et al. |
| 5,004,659 | A | 4/1991 | Vermeulen et al. |
| 5,021,350 | A | 6/1991 | Jung et al. |
| 5,026,597 | A | 6/1991 | Franz et al. |
| 5,026,607 | A | 6/1991 | Kiezulas |
| 5,112,903 | A | 5/1992 | Sakakibara et al. |
| 5,120,816 | A | 6/1992 | Gould et al. |
| 5,126,209 | A | 6/1992 | Kruger |
| 5,132,146 | A | 7/1992 | Maruyama et al. |
| 5,135,753 | A | 8/1992 | Baker et al. |

(Continued)

FOREIGN PATENT DOCUMENTS

| | | |
|---|---|---|
| EP | 0 732 387 A1 | 9/1996 |

*Primary Examiner*—Callie Shosho
(74) *Attorney, Agent, or Firm*—Hoffmann & Baron, LLP

(57) ABSTRACT

A coating composition is disclosed which comprises an aqueous polymeric matrix, a hydrophilic polymer, a colloidal metal oxide and a crosslinker. The coating composition when applied on medical devices is hydrophilic, shows improved lubricity, abrasion resistance and substrate adhesion on metallic or plastic substrates. The coating also shows improved water sheeting thus providing the coated substrates with anti-fog properties. The coating absorbs aqueous dye or stain solutions making the substrate suitable for printing.

116 Claims, No Drawings

U.S. PATENT DOCUMENTS 5,147,655 A 9/1992 Ibsen
5,157,049 A 10/1992 Haugwitz et al.
5,160,790 A 11/1992 Elton
5,177,113 A 1/1993 Biss et al.
5,192,536 A 3/1993 Huprich
5,212,008 A 5/1993 Malhotra et al.
5,213,740 A 5/1993 Fuller
5,221,555 A 6/1993 Saverin et al.
5,223,309 A 6/1993 Farivar et al.
5,236,532 A 8/1993 Taylor et al.
5,236,886 A 8/1993 Tsuchiya et al.
5,260,186 A 11/1993 Cercek et al.
5,262,475 A 11/1993 Creasy
5,262,486 A 11/1993 Telser et al.
5,271,946 A 12/1993 Hettche
5,272,012 A 12/1993 Opolski
5,284,900 A 2/1994 Izubayashi et al.
5,290,585 A 3/1994 Elton
5,306,504 A 4/1994 Lorenz
5,308,680 A * 5/1994 Desjarlais et al. ......... 428/32.5
5,310,559 A 5/1994 Shah et al.
5,318,886 A 6/1994 Saverin et al.
5,320,100 A 6/1994 Herweck et al.
5,334,482 A 8/1994 Aono
5,334,691 A 8/1994 Gould et al.
5,350,795 A 9/1994 Smith et al.
5,352,277 A 10/1994 Sasaki
5,382,703 A 1/1995 Nohr et al.
5,401,708 A 3/1995 Shimizu et al.
5,422,123 A 6/1995 Conte et al.
5,438,709 A 8/1995 Green et al.
5,447,799 A 9/1995 Loh et al.
5,454,807 A 10/1995 Lennox et al.
5,460,620 A 10/1995 Smith et al.
5,464,633 A 11/1995 Conte et al.
5,464,650 A 11/1995 Berg et al.
5,487,920 A 1/1996 Lopata et al.
5,492,962 A 2/1996 Lahrman et al.
5,500,253 A * 3/1996 Sanduja et al. .......... 427/385.5
5,505,956 A 4/1996 Kim et al.
5,513,654 A 5/1996 Delson
5,521,002 A 5/1996 Sneed
5,525,327 A 6/1996 Baker et al.
5,532,221 A 7/1996 Huang et al.
5,532,373 A 7/1996 Matsumoto et al.
5,536,264 A 7/1996 Hsueh et al.
5,538,512 A 7/1996 Zenzon et al.
5,562,922 A 10/1996 Lambert
5,567,507 A 10/1996 Paff et al.
5,573,909 A 11/1996 Singer et al.
5,576,072 A 11/1996 Hostettler et al.
5,578,669 A 11/1996 Odawa et al.
5,585,186 A 12/1996 Scholz et al.
5,588,962 A 12/1996 Nicholas et al.
5,599,576 A 2/1997 Opolski
5,603,957 A 2/1997 Burguiere et al.
5,607,475 A 3/1997 Cahalan et al.
5,612,426 A 3/1997 Nakano et al.
5,624,411 A 4/1997 Tuch
5,642,530 A 7/1997 Parks
5,645,855 A 7/1997 Lorenz
5,649,326 A 7/1997 Richard, Jr. et al.
5,660,873 A 8/1997 Nikolaychik et al.
5,662,960 A 9/1997 Hostettler et al.
5,668,128 A 9/1997 Tsubotani et al.
5,674,192 A 10/1997 Sahatjian et al.
5,679,400 A 10/1997 Tuch
5,681,583 A 10/1997 Conte et al.
5,686,099 A 11/1997 Sablotsky et al.
5,693,014 A 12/1997 Abele et al.
5,695,871 A 12/1997 Tallentire et al.
5,700,559 A 12/1997 Sheu et al.
5,702,754 A 12/1997 Zhong
5,712,027 A 1/1998 Ali et al.
5,713,881 A 2/1998 Rezai et al.
5,714,360 A 2/1998 Swan et al.
5,723,175 A 3/1998 Scholz et al.
5,733,572 A 3/1998 Unger et al.
5,739,181 A 4/1998 Khudyakov et al.
5,746,745 A 5/1998 Abele et al.
5,746,998 A 5/1998 Torchilin et al.
5,747,178 A 5/1998 Sodervall et al.
5,753,373 A 5/1998 Scholz et al.
5,753,409 A 5/1998 Takabayashi et al.
5,766,158 A 6/1998 Opolski
5,766,772 A 6/1998 Ciocca et al.
5,776,184 A 7/1998 Tuch
5,776,611 A 7/1998 Elton et al.
5,780,057 A 7/1998 Conte et al.
5,780,148 A 7/1998 Ohtake et al.
5,782,908 A 7/1998 Cahalan et al.
5,783,209 A 7/1998 Imamura et al.
5,785,995 A 7/1998 Daisy, Jr. et al.
5,789,148 A 8/1998 Van Vlasselaer et al.
5,795,696 A 8/1998 Malhotra
5,804,612 A 9/1998 Song et al.
5,817,325 A 10/1998 Sawan et al.
5,824,048 A 10/1998 Tuch
5,827,630 A 10/1998 Eichorst et al.
5,833,707 A 11/1998 McIntyre et al.
5,837,008 A 11/1998 Berg et al.
5,837,313 A 11/1998 Ding et al.
5,843,347 A 12/1998 Nguyen et al.
5,846,566 A 12/1998 Burguiere et al.
5,846,650 A 12/1998 Ko et al.
5,849,311 A 12/1998 Sawan et al.
5,849,368 A 12/1998 Hostettler et al.
5,854,708 A 12/1998 Komatsu et al.
5,868,724 A 2/1999 Dierckes, Jr. et al.
5,873,904 A 2/1999 Ragheb et al.
5,873,931 A 2/1999 Scholz et al.
5,877,254 A 3/1999 La Casse et al.
5,886,026 A 3/1999 Hunter et al.
5,891,867 A 4/1999 Lanquetin et al.
5,897,955 A 4/1999 Drumheller
5,900,246 A 5/1999 Lambert
5,914,182 A 6/1999 Drumheller
5,916,585 A 6/1999 Cook et al.
5,916,673 A 6/1999 Fryberg et al.
5,919,411 A 7/1999 Rezai et al.
5,919,552 A 7/1999 Malhotra
5,919,570 A 7/1999 Hostettler et al.
5,922,359 A 7/1999 Youssefyeh
5,922,519 A 7/1999 Ishikawa et al.
5,922,808 A 7/1999 Hanada et al.
5,925,299 A 7/1999 Kierckes, Jr. et al.
5,925,552 A 7/1999 Keogh et al.
5,928,279 A 7/1999 Shannon et al.
5,932,299 A 8/1999 Katoot
5,939,182 A 8/1999 Huang et al.
5,948,227 A 9/1999 Dubrow
5,951,586 A 9/1999 Berg et al.
5,958,598 A 9/1999 Khudyakov et al.
5,965,600 A 10/1999 Sato et al.
5,968,091 A 10/1999 Pinchuk et al.
5,976,169 A 11/1999 Imran
5,977,130 A 11/1999 Sato et al.
5,980,551 A 11/1999 Summers et al.
5,993,972 A 11/1999 Reich et al.
5,997,621 A 12/1999 Scholz et al.
6,010,480 A 1/2000 Abele et al.
6,010,836 A 1/2000 Eichorst et al.
6,013,855 A 1/2000 McPherson et al.
6,017,577 A 1/2000 Hostettler et al.

| | | | |
|---|---|---|---|
| 6,017,741 A | 1/2000 | Keogh | |
| 6,022,562 A | 2/2000 | Autant et al. | |
| 6,030,656 A | 2/2000 | Hostettler et al. | |
| 6,033,687 A | 3/2000 | Heinicke et al. | |
| 6,033,719 A | 3/2000 | Keogh | |
| 6,036,697 A | 3/2000 | DiCaprio | |
| 6,036,966 A | 3/2000 | Youssefyeh | |
| 6,040,053 A | 3/2000 | Scholz et al. | |
| 6,040,058 A | 3/2000 | Hostettler et al. | |
| 6,040,408 A | 3/2000 | Koole | |
| 6,042,710 A | 3/2000 | Dubrow | |
| 6,042,877 A | 3/2000 | Lyon et al. | |
| 6,044,843 A | 4/2000 | O'Neil et al. | |
| 6,048,620 A | 4/2000 | Zhong | |
| 6,071,266 A | 6/2000 | Kelley | |
| 6,074,742 A | 6/2000 | Smith et al. | |
| 6,077,698 A | 6/2000 | Swan et al. | |
| 6,080,488 A | 6/2000 | Hostettler et al. | |
| 6,083,609 A | 7/2000 | Susaki et al. | |
| 6,096,726 A | 8/2000 | Opolski | |
| 6,099,563 A | 8/2000 | Zhong | |
| 6,106,889 A | 8/2000 | Beavers et al. | |
| 6,110,585 A | 8/2000 | Shaw-Klein | |
| 6,120,847 A | 9/2000 | Yang et al. | |
| 6,120,904 A | 9/2000 | Hostettler et al. | |
| 6,121,027 A | 9/2000 | Clapper et al. | |
| 6,127,364 A | 10/2000 | Dyker et al. | |
| 6,149,940 A | 11/2000 | Maggi et al. | |
| 6,150,019 A | 11/2000 | Smith et al. | |
| 6,153,252 A | 11/2000 | Hossainy et al. | |
| 6,153,299 A | 11/2000 | Smith et al. | |
| 6,159,488 A | 12/2000 | Nagler et al. | |
| 6,160,067 A | 12/2000 | Eriyama et al. | |
| 6,161,399 A | 12/2000 | Jayaraman | |
| 6,165,493 A | 12/2000 | Neurath et al. | |
| 6,179,817 B1 | 1/2001 | Zhong | |
| 6,200,338 B1 | 3/2001 | Solomon et al. | |
| 6,214,385 B1 | 4/2001 | Heinicke et al. | |
| 6,214,901 B1 | 4/2001 | Chudzik et al. | |
| 6,218,016 B1 | 4/2001 | Tedeschi et al. | |
| 6,221,425 B1 | 4/2001 | Michal et al. | |
| 6,224,794 B1 | 5/2001 | Amsden et al. | |
| 6,224,971 B1 | 5/2001 | Tomizawa et al. | |
| 6,225,391 B1 | 5/2001 | Parthasarathy et al. | |
| 6,231,600 B1 | 5/2001 | Zhong | |
| 6,232,328 B1 | 5/2001 | Dorn et al. | |
| 6,232,340 B1 | 5/2001 | Zhang et al. | |
| 6,238,799 B1 | 5/2001 | Opolski | |
| 6,242,041 B1 | 6/2001 | Katoot et al. | |
| 6,248,112 B1 | 6/2001 | Gambale et al. | |
| 6,254,634 B1 | 7/2001 | Anderson et al. | |
| 6,258,121 B1 | 7/2001 | Yang et al. | |
| 6,265,016 B1 | 7/2001 | Hostettler et al. | |
| 6,268,101 B1 | 7/2001 | Yacobucci et al. | |
| 6,270,902 B1 | 8/2001 | Tedeschi et al. | |
| 6,275,728 B1 | 8/2001 | Venkatraman et al. | |
| 6,280,673 B1 | 8/2001 | Green et al. | |
| 6,280,745 B1 | 8/2001 | Flore et al. | |
| 6,287,285 B1 | 9/2001 | Michal et al. | |
| 6,288,076 B1 | 9/2001 | Kostyniak et al. | |
| 6,293,966 B1 | 9/2001 | Frantzen | |
| 6,296,694 B1 | 10/2001 | Miller | |
| 6,299,604 B1 | 10/2001 | Ragheb et al. | |
| 6,299,980 B1 | 10/2001 | Shah et al. | |
| 6,303,144 B1 | 10/2001 | Omura | |
| 6,303,179 B1 | 10/2001 | Koulik et al. | |
| 6,303,225 B1 | 10/2001 | Veerasamy | |
| 6,306,166 B1 | 10/2001 | Barry et al. | |
| 6,309,709 B1 | 10/2001 | Valentini et al. | |
| 6,309,723 B1 | 10/2001 | Ding et al. | |
| 6,312,858 B1 | 11/2001 | Yacobucci et al. | |
| 6,313,335 B1 | 11/2001 | Roberts et al. | |
| 6,315,790 B1 | 11/2001 | Gerberding et al. | |
| 6,316,018 B1 | 11/2001 | Ding et al. | |
| 6,326,083 B1 | 12/2001 | Yang et al. | |
| 6,329,374 B1 | 12/2001 | Dorn et al. | |
| 6,329,488 B1 | 12/2001 | Terry et al. | |
| 6,333,347 B1 | 12/2001 | Hunter et al. | |
| 6,335,029 B1 | 1/2002 | Kamath et al. | |
| 6,335,102 B1 | 1/2002 | Tsubaki et al. | |
| 6,340,367 B1 | 1/2002 | Stinson et al. | |
| 6,340,465 B1 * | 1/2002 | Hsu et al. | 424/400 |
| 6,346,281 B1 | 2/2002 | DeAth et al. | |
| 6,346,353 B1 | 2/2002 | Wang et al. | |
| 6,353,041 B1 | 3/2002 | Qian | |
| 6,368,658 B1 | 4/2002 | Schwarz et al. | |
| 6,623,817 B1 * | 9/2003 | Yang et al. | 428/32.12 |
| 6,632,485 B1 * | 10/2003 | Tang et al. | 428/32.1 |
| 2001/0000769 A1 | 5/2001 | Bhattacharjee et al. | |
| 2001/0000785 A1 | 5/2001 | Opolski | |
| 2001/0000802 A1 | 5/2001 | Soykan et al. | |
| 2001/0005512 A1 | 6/2001 | Anderson | |
| 2001/0010016 A1 | 7/2001 | Modak et al. | |
| 2001/0011165 A1 | 8/2001 | Engelson et al. | |
| 2001/0011779 A1 | 8/2001 | Stover et al. | |
| 2001/0013668 A1 | 8/2001 | Neavin et al. | |
| 2001/0018068 A1 | 8/2001 | Lorenzi et al. | |
| 2001/0019182 A1 | 9/2001 | Hebrink et al. | |
| 2001/0021763 A1 | 9/2001 | Harris | |
| 2001/0022663 A1 | 9/2001 | Ishikawa et al. | |
| 2001/0022982 A1 | 9/2001 | Neavin et al. | |
| 2001/0024719 A1 | 9/2001 | Lewis | |
| 2001/0027299 A1 | 10/2001 | Yang et al. | |
| 2001/0030808 A1 | 10/2001 | Komatsu et al. | |
| 2001/0034363 A1 | 10/2001 | Li et al. | |
| 2001/0038831 A1 | 11/2001 | Park et al. | |
| 2001/0038977 A1 | 11/2001 | Katoh | |
| 2001/0044012 A1 | 11/2001 | Malhotra | |
| 2001/0044159 A1 | 11/2001 | Lyles | |
| 2001/0046559 A1 | 11/2001 | Hewitson | |
| 2001/0047046 A1 | 11/2001 | Gupta et al. | |
| 2001/0051669 A1 | 12/2001 | McGhee | |
| 2001/0053421 A1 | 12/2001 | Schaller | |
| 2002/0001718 A1 | 1/2002 | Veerasamy | |
| 2002/0002124 A1 | 1/2002 | Biedermann et al. | |
| 2002/0002242 A1 | 1/2002 | McNamara et al. | |
| 2002/0002353 A1 | 1/2002 | Michal et al. | |
| 2002/0004067 A1 | 1/2002 | Crison et al. | |
| 2002/0006493 A1 | 1/2002 | Chabrecek et al. | |
| 2002/0006886 A1 | 1/2002 | Beerse et al. | |
| 2002/0006919 A1 | 1/2002 | Thosar et al. | |
| 2002/0007111 A1 | 1/2002 | Deckert et al. | |
| 2002/0008750 A1 | 1/2002 | Moriya et al. | |
| 2002/0009576 A1 | 1/2002 | Fu et al. | |
| 2002/0012773 A1 | 1/2002 | Valdya et al. | |
| 2002/0012774 A1 | 1/2002 | Neithardt et al. | |
| 2002/0013294 A1 | 1/2002 | DeLong et al. | |
| 2002/0013549 A1 | 1/2002 | Zhong et al. | |
| 2002/0016393 A1 | 2/2002 | Hogan et al. | |
| 2002/0016574 A1 | 2/2002 | Wang et al. | |
| 2002/0016625 A1 | 2/2002 | Falotico et al. | |
| 2002/0018898 A1 | 2/2002 | Opolski | |
| 2002/0019202 A1 | 2/2002 | Thomas et al. | |
| 2002/0022046 A1 | 2/2002 | Tedeschi et al. | |
| 2002/0022103 A1 | 2/2002 | Fujiwara | |
| 2002/0022214 A1 | 2/2002 | Simmet | |
| 2002/0022849 A1 | 2/2002 | Sydney et al. | |
| 2002/0025341 A1 | 2/2002 | Qui et al. | |
| 2002/0028857 A1 | 3/2002 | Holy | |
| 2002/0031731 A1 | 3/2002 | Hosokawa | |
| 2002/0037395 A1 | 3/2002 | Zhong et al. | |
| 2003/0148073 A1 * | 8/2003 | Landry-Coltrain et al. | 428/195 |
| 2004/0089433 A1 * | 5/2004 | Propst et al. | 162/158 |
| 2004/0091645 A1 * | 5/2004 | Heederik et al. | 428/32.1 |

* cited by examiner

COATING COMPOSITION FOR MULTIPLE HYDROPHILIC APPLICATIONS

CROSS-REFERENCE TO RELATED APPLICATION

This application claims the benefit of U.S. Provisional Application No. 60/376,983, filed on Apr. 30, 2002, the disclosure of which is incorporated by reference.

BACKGROUND OF INVENTION

1. Field of Invention

The present invention relates to an aqueous composition of a hydrophilic coating formulation which provides a substrate consisting of plastic, metal, glass, cellulose or fiber, e.g. medical devices, protection shields, window sheets, greenhouse walls, freezer doors, food packaging foils and printing paper with a useful hydrophilic coating of good adhesion, good lubricity and high durability.

2. Background Art

Polymeric compositions have been disclosed having surface properties or surface coatings useful in medical applications, anti-fog applications and ink-absorbing (or printing) applications. However, the known compositions have drawbacks or can be significantly improved as discussed below.

1. Medical Applications

A variety of polymers have been suggested to be useful as coatings for medical devices, e.g. polyethylene oxide (PEO), polyethylene glycol (PEG), polyvinyl pyrrolidone (PVP), and polyurethane (PU). Besides blood-compatibility, coatings providing friction-reduction, high durability and good adhesion to the substrate with or without drug release and/or radio-opaque properties are of increasing interest for such devices.

Polyvinyl pyrrolidone (PVP) has been suggested for use as a coating alone or in combination with other polymers. For example, polyvinyl pyrrolidone may be bonded to a substrate by thermally activated free radical initiators, UV light activated free-radical initiators, or E-beam radiation. One disadvantage of using such coatings is that E-beam radiation can be deleterious to some of the materials used in medical devices.

The prior art also teaches that PVP is generally used in solvent and/or water based formulations in combination with other polymers. One such coating is made from PVP and glycidyl acrylate. This coating requires the presence of amino groups on the surface of the substrate to react with the epoxy groups of the glycidyl acrylate to covalently bond the PVP-containing copolymer to the substrate. Silicone rubber does not contain any free amino groups, and thus this type of coating cannot form covalent bonds with the surface of the silicone substrate, resulting in poor adhesion.

Other suggested coatings are composed of a mixture of PVP and polyurethane. These coatings provide low friction surfaces when wet. One such coating is a polyvinyl pyrrolidone-polyurethane interpolymer. Another such coating is composed of hydrophilic blends of polyvinyl pyrrolidone (PVP) and linear preformed polyurethanes. In addition, PVP may be incorporated into a PU network by combining a polyisocyanate and a polyol with a PVP solution. Still another such coating is composed of two layers: a primer and a top coat. The primer coat is a polyurethane prepolymer containing free isocyanate groups, while the top coat is a hydrophilic copolymer of PVP and a polymer having active hydrogen groups, such as acrylamide.

Water-based polyurethane coating compositions providing medical devices with hydrophilic surfaces are of particular interest. Such coatings have been suggested which contain a polyurethane matrix and a hydrophilic polymer selected from the group of polyvinylpyrrolidone, polyethylene oxide, methylcellulose and others so that the article becomes slippery and lubricious when wet.

The mentioned polymers have been used in combination with various other materials to produce improved lubricious coatings for devices such as general medical tubing, catheters, guidewires, stents and alike.

The polymeric matrix typically contains aziridines, carbodiimides and others as crosslinkers and an organic acid to provide adequate adhesion to the substrate. However, the preferred crosslinkers, e.g. certain aziridines, can be caustic, must be fully reacted before in vivo use, will hydrolyse in water or humid air, and/or will react rapidly with acids. Also, once the crosslinker is incorporated into the coating solution, it generally must be used within about 48 hrs. Increased temperature will also deactivate the coating material and will promote accelerated crosslinking, resulting in higher viscosity.

The coatings also typically require a pretreatment of the substrate, such as a chemical primer, plasma or corona discharge or exposing the surface to a flame to provide adequate adhesion to the substrate.

Other coatings, e.g. coatings incorporating PEO and isocyanates, have also been suggested. Additionally, polyols may be combined with PEO/isocyanate coatings to produce a crosslinked polyurethane (PU) network entrapping the PEO. However, such coating generally have the same drawbacks as discussed above.

Methods for providing a medical apparatus with a protective surface coating have also been suggested to make the medical apparatus scratch and puncture resistant. The protective coating comprises a polymeric matrix consisting of a water-based urethane, acrylic or epoxy and uses elevated curing temperatures. Plasma or corona pretreatments or the use of a primer is suggested. The polymeric matrix is reinforced by lamellar or fiber-like agents such as micaceous pigments, glass fiber or tungstan powder for higher surface hardness. The coating also comprises polyfunctional aziridine, carbodiimides, urea formaldehyde, melamine formaldehyde, crosslinker condensates, epoxies, isocyanates, titanates, zinc compounds or silanes as crosslinkers. The crosslinkers are added optionally to provide improved hardness, adhesion and chemical and water resistance. The coating further comprises an anti-slip additive or antimicobials or therapeutic agents.

A multicomponent complex for sustained delivery of bioeffective agents has also been suggested in which the bioeffective agent is anchored by covalent bonds with aziridines, epoxys, formaldehydes or metalesters to a urethane on a medical device made of steel or urethane. The preferred covalent bonds for a cleavable linkage under hydrolysis reaction are esters. Hydroxy-terminal hydrophilic materials such as polyethylene oxide can be co-reacted to improve hydrophilicity. Alternatively a multilayer polymeric system can be used with up to three layers.

However, none of these coatings have sufficient adhesion to coat substrates such as silicone, polished stainless steel, PEBAX and alike. Because these coatings do not form covalent linkages with the silicone surface of the substrate, they have poor adherence and durability and are relatively easy rubbed off from the surface when wetted.

Hydrophilic polyurethanes have also been suggested using formulations other than with PVP as coatings for medical devices. For example, coatings composed of polyurethane hydrogels containing a random mixture of polyisocyanates and a polyether dispersed in an aqueous liquid phase have been suggested. Polyurethanes have also been used as coatings in compositions containing chain-extended hydrophilic thermoplastic polyurethane polymers with a variety of hydrophilic high molecular weight non-urethane polymers. It has also been suggested to mix urethane with a silicone or siloxane emulsion. The carboxylic acid groups of the substrate and coating may then be linked with a cross-linking agent, such as a polyfunctional aziridine.

However, because the urethane and non-urethane polymers cannot react with one another or the surface to be coated, the resulting coatings have poor adhesion, especially to silicone surfaces. Also, since silicone surfaces do not contain free carboxylic acid groups, a crosslinker such as a polyfunctional aziridine will not covalently bond known coatings to the surface of a silicone substrate.

Accordingly, it has been suggested to apply solutions of polyvinylpyrrolidone with isocyanate and/or polyurethane in multi-step operations. However, these coatings often lack good durability. Moreover, it is difficult to control the exact composition of the final coating, because the composition is a complex function of several factors, such as the amounts of each of the coating solutions that happen to deposit on the substrate, the amount of the first coating that happens to react with other material before the top coat is applied, or the amount of the first coating that re-dissolves when the additional coating is applied. Coating composition uniformity of these multi-step coatings is further complicated because, during dip coating, different parts of the same object are likely to see different dwell times and therefore the amount of the first component that re-dissolves is variable. Multiple step coating processes are also more complex and more time, labor, and material intensive.

Thus there is a need for coatings for medical applications which can be applied economically, are biocompatible and provide improved adhesion to the substrate being coated, e.g. the medical device, and improved durability; while also providing improved lubricity (or reduced coefficient of friction) when the surface of the coating is contacted with water, body fluids or blood.

2. Anti-Fog Applications

In general, fog formation occurs under conditions of high humidity and high temperature or at interfacial boundaries where there is a large temperature and humidity difference. Coatings which reportedly reduce the tendency for surfaces to "fog up" (i.e., anti-fogging coatings) have been suggested.

In order to prevent this fogging, it is known to use various surface active agents to provide anti-fog properties to articles. For example, hydrophilic agents have been added to polyurethanes in order to impart anti-fog properties. Anti-fog coating compositions for transparent surfaces which include a three-dimensional cross-linked polyurethane having a free surface active agent disposed within open domains in its cross-linked structure have been suggested. The coating compositions are prepared by reacting isocyanates with polyfunctional polyols to obtain a polyurethane, and subsequently contacting the thus prepared polyurethane with a hydrophilic surface-active agent in order to diffuse molecules of the surface-active agent into the interior of the coating.

The surface-active agent, however, is not chemically reacted into the polyurethane, but is instead physically disposed within the polymeric structure. As such, the cured coating is susceptible to undesirable leaching and erosion of the surfactant, thereby decreasing the anti-fog properties of the coating composition.

It has also been proposed to react surface active agents into a polyurethane coating composition in order to impart anti-fog properties to the coating composition. For example, the addition of sulfonated "resins" to polyurethanes in order to prepare coatings with various properties including anti-fog characteristics have been suggested. The resins are prepared from diols or diamines reacted with di-carboxylic acid esters, followed by sulfonation of double bonds or quarternization of amines. The resins are intended to increase the hydrophilic character and water absorption of the polyurethane coatings by reacting into the polyurethane backbone in an end-to-end fashion, rather than as pendent groups. Such resins which react in an end-to-end fashion, as opposed to remaining pendant at the end of the polyurethane chain, cannot provide for a clear delineation of hydrophilic and hydrophobic groups and in this respect do not behave as surfactants, i.e., they do not provide cooperation between distinct hydrophilic and hydrophobic portions to reduce interfacial tension.

Polyurethane compositions have also been suggested which are useful as coatings for transparent substrates with improved self-healing properties and prevention against formation of surface moisture. The polyurethane compositions are prepared from a reaction of an isocyanate with a polyol mixture including a difunctional sulfonated polyether polyol and a trifunctional polyol. Such a polyurethane composition incorporates only polyol combinations which impart hydrophilic character to the coating, and does not further incorporate into the composition a surfactant material.

However, these compositions do not provide permanent fog resistance properties, i.e. fog resistant properties which last after repeated washings or extended soaking in water, nor are they effective for more than a few hours of use.

Additionally, it is known to incorporate non-ionic surfactants containing reactive functional groups into polyurethanes prepared with polyvinylpyrrolidone as a hydrophilic agent. For example, anti-fog coating compositions incorporating an isocyanate prepolymer which is reacted with a polyvinylpyrrolidone polymer, the reaction product thereof being subsequently reacted with a non-ionic surfactant having reactive groups for reacting with the isocyanate, for instance, hydroxyl reactive groups are known. Polyvinylpyrrolidone polymers, however, while serving to increase the hydrophilicity of the polyurethane matrix and improve anti-fog properties, generally reduce the scratch-resistance, chemical resistance, water sensitivity, and durability of the cured polyurethane surface. Thus, although these compositions, when cured, have been known to provide anti-fog properties, their solvent sensitivity, flexibility and scratch resistance properties are less than desirable.

Thus, a need exists for a polyurethane composition which when cured provides enhanced chemical resistance and scratch resistance in addition to long lasting, permanent anti-fog properties and which are not easily susceptible to erosion or leaching out of the surfactant.

3. Ink Absorbing Applications

Various coatings have been suggested to improve ink receptivity to hydrophobic surfaces. Typically, a hydrophilic material is applied to the hydrophobic surface to make it more receptive to a water based ink. For example, a printing medium for inkjet printing has been suggested which includes a polyurethane or other hydrophobic binder and polyvinylpyrrolidone with silica as a filler. A crosslinker can also be used. The medium is applied as a first and second layer to the medium substrate. The second coating layer has a microporous structure and comprises at least one hydrophobic polymer and silica as liquid absorbing filler dispersed substantially throughout the at least one hydrophobic polymer.

A coating for transparency sheets for plotter recording has also been suggested which includes a polyurethane and a highly hydrophilic polymer. The hydrophilic polymer is preferably polyvinylpyrrolidone which is admixed with a "water borne" polyurethane. Silica is added in powdered form as anti-blocking agent.

A recording sheet for ink jet printing has also been suggested which is coated with at least one film forming, hydrophilic polymer or a mixture of film forming polyvinylpyrrolidone and/or polyurethane and imbedded in this film at least one trivalent salt of a metal of the Group IIIb series of the periodic table of elements. The salts or complexes of Group IIIb elements can be coated directly on the substrate surface without the presence of the film forming polymer. The film can use a crosslinker from the group of formaldehydes, triazines or dioxans and others. The film can use colloidal silica as filler or pigmentation resulting in a matte white polymer and not clear.

However, due to the layered structure, the application of such coatings are labor intensive, rather costly in design of printing paper and apparently do not provide suitability for coating hydrophobic plastic foils, metallic foils or other metallic surfaces when using an ink jet printer with water-based ink for printing.

Thus, there is a need for an improved one-step ink receptive coating which is economical, durable and which does not have the above-mentioned disadvantages.

Thus, it is an object of this invention to provide a hydrophilic, lubricous organic coating which exhibits a significantly reduced coefficient of friction when exposed to water or aqueous solutions.

It is another object of this invention to provide a hydrophilic, extremely lubricious organic coating which retains its lubricity when wetted even after prolonged contact to water or aqueous solutions, and even after repeated moistening/drying cycles.

It is an object of this invention to provide a hydrophilic, lubricious organic coating which has good adherence to substrates, particularly inorganic substrates.

Another object of this invention is to provide a hydrophilic, lubricious coating which has high durability and has been found to provide adequate lubricity and improved durability when applied to metals.

It is another object of this invention to provide coatings in accordance with the preceding objects which are particularly useful for application to outer inorganic surfaces of medical devices with good adherence to the devices and which are non-toxic and non-deleterious to the body.

Another object of this invention is to provide a method of applying a hydrophilic, extremely lubricious organic coating having the qualities set forth in the preceding objects, which method can be carried out using a single coating solution.

Another object of this invention is to provide a coating, which is suitable for drug delivery including a drug release with a distinct release profile depending on the effective dosage requirement over time for the individual medical device the coating is applied to.

Another object of this invention is to provide a coating, which can accommodate an appropriate radio-opaque agent with or without a combination of controlled drug release for enhanced x-ray visibility of the coated medical devices.

SUMMARY OF INVENTION

According to the present invention, a coating composition is provided which, when applied to a substrate surface (e.g. plastic or metal), addresses the above-mentioned objects and shows improved lubricity, abrasion resistance and substrate adhesion. The coating also shows improved water sheeting to provide a coated substrate with anti-fog properties. The coating also absorbs aqueous ink, dye or stain solutions making the substrate suitable for printing.

More specifically, the invention is directed to a coating composition which includes a multifunctional polymeric carrier dispersed or emulsified in water and capable of forming a polymeric matrix, a hydrophilic polymer, a colloidal metal oxide, a crosslinker and, optionally, at least one auxiliary agent.

The present invention provides a water-based hydrophilic coating composition, which when applied by various methods to surfaces of plastic, metal, glass, cellulose or fiber, provides, upon drying said surfaces with a hydrophilic coating of good adhesion, high lubricity, high durability and high abrasion resistance. The composition of the coating formulation which provides said surface with a unique hydrophilic coating comprises a multifunctional polymer or polymer combination, a hydrophilic polymer, colloidal metal oxide or colloidal metal oxide mixtures and a crosslinker or hardener. Optionally the coating composition of the present invention contains at least one auxiliary agent consisting of an auxiliary agent for performance enhancement of the aqueous coating composition and/or the resulting hydrophilic coating of the coated surface.

The auxiliary agent can be a solvent, a coating aid, a dye or a pigment, a performance enhancer, a catalyst, a biocide, a bio-effecting agent, a vitamin, a drug, a therapeutic agent, a radiopaque agent or a combination thereof. The novel coating composition is useful with superior performance as a lubricous coating for medical devices, as an anti-fog coating and as a carrier for inks in a printing process.

Specific applications include the following:

Medical Device Applications

Medical devices coated with the formulation according to the present invention become lubricious after drying and rewetted by contact with water or by introduction into a human or animal body, when brought into contact with body fluid. The hydrophilic coating for medical devices can optionally contain a drug for therapeutic purposes with or without elution. Alternatively, anti-microbials and bio-effecting agents can be chemically bonded into the hydrophilic coating for biostatic purposes. The hydrophilic coating according to the present invention can also have a chemically bonded radio-opaque substance to enhance X-Ray visibility of plastic or metallic medical devices during the process of introduction into the body or during an intended period of service time once it is implemented into the body.

Thus, the present invention is directed to a method of providing a substrate, particularly a medical device or a part of such device intended for introduction in the human body, with a hydrophilic coating becoming lubricous when contacted with an aqueous fluid, which method among others makes it possible to coat devices which are sensitive to high processing temperatures, such as (PET) balloon catheters. The hydrophilic polymer becomes covalently bonded to the polymers of an underlying coating to form a unitary hydrophilic coating.

Anti-Fog Application

The invention also relates to the use of the composition as a hydrophilic coating to be applied on metal, glass or plastic surfaces to prevent water droplet formation on said surfaces when exposed to air of high humidity, to water vapor or when transferred from low temperature environment to higher temperature environment causing the surfaces usually to fog up. The applied hydrophilic coating according to the present invention is useful for preventing water condensation on said metallic, plastic, glass surfaces and alike. It also maintains good transparency on clear plastic or glass used as protective shields, windows, windshields, greenhouse panels, food packaging foils, goggles, optical glasses, contact lenses and the like.

Thus, the present invention is also directed to a coating formulation which provides metallic or plastic surfaces with slippery properties when exposed to water, water fog or aqueous solution. The coated surfaces show a homogeneous water-sheeting effect and do not fog up by condensed water droplets.

Ink Absorbing Application

The hydrophilic coating formulation of the present invention is also useful for coating metals, metallic foils, plastics, paper or textiles to provide hydrophilic surfaces on said substrates to make them absorbable for inks, dyes and colorants, which would otherwise not adhere to the substrates. The surfaces with the applied hydrophilic coating formulation become suitable for a printing process to provide good adhesion for black and color printing text or picture, e.g. by an inkjet printer.

Thus, the present invention is also directed to a hydrophilic coating formulation which absorbs water-based inks and dyes for printing on metallic, paper, textile and plastic substrates. The hydrophobic coating formulation has enhanced adhesion to metallic, fiber, textile and plastics for such purposes.

The present invention provides coating compositions containing an aqueous polymeric matrix, a hydrophilic polymer, a colloidal metal oxide and a crosslinker, which provide a coated substrate having improved lubricity, abrasion resistance and substrate adhesion; improved water sheeting to provide a coated substrate with anti-fog properties; and improved absorption of aqueous ink, dye or stain solutions making the substrate suitable for printing.

In one aspect the present invention is directed to an aqueous coating composition for providing the surface of an object with a durable hydrophilic coating including:

a) a multifunctional polymeric carrier dispersed or emulsified in water, capable of forming a polymeric matrix;

b) a hydrophilic water-soluble organic monomer, oligomer, prepolymer, polymer or copolymer;

c) a multifunctional aqueous colloidal metal oxide; and d) a multifunctional crosslinker.

In one embodiment the dispersed or emulsified multifunctional polymeric carrier is a modified polymeric urethane, urea, ester, ether, carbonate, vinyl, acrylic, methacrylic, alkyd, acrylamide, maleic anhydride, an epoxy prepolymer and related polymers or a combination thereof.

In one embodiment the hydrophilic organic monomer, oligomer, prepolymer or copolymer is derived from vinyl alcohol, N-vinylpyrrolidone, N-vinyl lactam, acrylamide, amide, styrenesulfonic acid, combination of vinylbutyral and N-vinylpyrrolidone, hydroxyethyl methacrylate, acrylic acid, vinylmethyl ether, vinylpyridylium halide, melamine, maleic anhydride/methyl vinyl ether, vinylpyridine, ethyleneoxide, ethyleneoxide ethylene imine, glycol, vinyl acetate, vinyl acetate/crotonic acid, methyl cellulose, ethyl cellulose, carboxymethyl cellulose, hydroxyethyl cellulose, hydroxypropyl cellulose, hydroxymethyl ethyl cellulose, hydroxypropylmethyl cellulose, cellulose acetate, cellulose nitrate, starch, gelatin, albumin, casein, gum, alginate, hydroxyethyl (meth)acrylate, hydroxypropyl (meth)acrylate, ethylene glycol (meth)acrylates (e.g. triethylene glycol (meth)acrylate) and meth)acrylamide), N-alkyl (meth) acrylamides (e.g. N-methyl (meth)acrylamide and N-hexyl (meth)acrylamide), N,N-dialkyl (meth)acrylamides (e.g. N,N-dimethyl (meth)acrylamide and poly-N,N-dipropyl (meth)acrylamide), N-hydroxyalkyl (meth)acrylamide polymers, such as poly-N-methylol (meth)acrylamide and poly-N-hydroxy ethyl (meth)acrylamide, and N,N-dihydroxyalkyl (meth)acrylamide polymers, such as poly-N,N-dihydroxyethyl (meth)acrylamide, ether polyols, polyethylene oxide, polypropylene oxide, and poly(vinyl ether), alkylvinyl sulfones, alkylvinylsulfone-acrylates and related compounds or a combination thereof.

In an embodiment, the multifunctional aqueous colloidal metal oxide is derived from the metals aluminum, silicon, titanium, zirconium, zinc, tin or silver and related colloidal metal oxides or a combination thereof.

In an embodiment, the colloidal metal oxide compound is an aluminate, silicate, titanate, zincate, stannate, argentite, aluminum silicate, aluminum titanate, zirconate zircoaluminate, related compounds, or a combination thereof.

In an embodiment, the multifunctional crosslinker is a multifunctional aziridine, carbodiimide, oxirane, alcohol, glycydyl ether, glycidyl ester, carboxyl compound, amine, epoxide, vinyl sulfone, amide, allyl compound and related hardener, their prepolymeric resins or a combination thereof.

The multifunctional aziridine can be selected from the group consisting of trimethylolpropane tri-[.beta.-(N-aziridinyl)-propionate, 2,2-bishydroxymethyl butanoltris[3-(1-aziridine) propionate], aziridine-2-methylol acrylate, aziridine-2-methylol methacrylate, N-(2-aziridinyl) methylacrylamide, N-(2-aziridinyl)methylmethacrylamide, 1-(aziridin-2-yl)-2-oxabut-3-ene, 4-(aziridin-2-yl)-but-1-ene, 5-(aziridin-2-yl)-pent-1-ene, and the like and their related prepolymeric resins or combinations therof.

The multifunctional carbodiimide can be a carbodiimide, a carbodiimide derivative, chemically related crosslinkers, their prepolymeric resins or combinations thereof.

The polyhydric alcohol can be a polyhydric alcohol selected from the group consisting of glycerin; pentaerythridol; ethylene glycol; diethylene glycol; triethylene glycol; tetraethylene glycol; polyethylene glycol; 1,2,3-propanetriol; polyglycerol; propylene glycol; 1,2-propanediol; 1,3-propanediol; trimethylol propane; diethanolamine; triethanolamine; polyoxypropylene oxyethylene-oxypropyle block copolymer; sorbitan fatty acid esters; polyexyethylene sorbitan fatty acid esters; pentaerythritol; sorbitol; a polyglycidyl ether compound; and a combination thereof.

Preferably, the polyglyidyl ether compound is selected from the group consisting of ethylene glycol diglycidyl ether, polyethylene glycol diglycidyl ether, glycerol polyglycidyl ether, diglycerol polyglycidyl ether, polyglycerol polyglycidyl ether, sorbitol polyglycidyl ether, pentaerythritol polyglycidyl ether, propylene glycol diglycidyl ether, and propylene glycol diglycidyl ether and a combination thereof.

In one embodiment, the hydrophilic coating also includes at least one auxiliary agent for performance enhancement of the aqueous coating composition and/or the resulting hydrophilic coating of the coated surface.

The multifunctional amine can be a polymeric amine and can be selected from the group consisting of melamine, hexamethylendiamine, hexamethylentetramine, guanidine and the like.

Preferably, the auxiliary agent is selected from a solvent, surfactant or wetting agent, emulsifier, dye, pigment, colorant, UV absorber, radical scavenger, antioxidant, anti-corrosion agent, optical brightener, fluorescers, bleaches, bleach activators, bleach catalysts, non-activated enzymes, enzyme stabilizing systems, chelants, coating aid, metal catalyst, metal oxide catalyst, organometallic catalyst, film-forming promoter, hardener, linking accelerator, flow agent, leveling agent, defoaming agent, lubricant, matte particle, rheological modifier, thickener, conductive or non-conductive metal oxide particle, magnetic particle, anti-static agent, pH control agents, perfumes, preservative, biocide, pesticide, anti-fouling agent, algicide, bactericide, germicides, disinfectant, fungicide, bio-effecting agent, vitamin, drug, therapeutic agent or a combination thereof.

In one embodiment, the auxiliary agent is optionally a radiopaque agent. For sufficient x-ray visibility it is preferred that the radiopaque agent is present in an amount of up to 75% by weight of the solids of the coating composition.

In one embodiment, the hydrophilic coating composition is formed into a gel. The gel is preferably used for topical transdermal application as a medical gel wound dressing in human or animal application.

In one embodiment, the polymeric carrier concentration is from 0.01% to 42%, preferably from 0.5% to 15%, based upon the total weight of the coating composition.

In one embodiment, the hydrophilic water-soluble organic monomer, oligomer, prepolymer, polymer or copolymer concentration is from 0.001% to 25%, preferably from 0.25% to 10%, based upon the weight of the coating composition.

In one embodiment, the multifunctional aqueous colloidal metal oxide concentration is from 0.01% to 25%, preferably from 0.25% to 20%, based upon the weight of the coating composition.

In one embodiment, the cross linker concentration is from 0.001 to 8%, preferably from 0.01% to 3%, based upon the weight of the coating composition.

In one embodiment, the concentration of the auxiliary agent for performance enhancing is from 0.001% to 10%, preferable from 0.01% to 5%, based upon the weight of the coating composition.

In one embodiment, the coating composition contains an organic solvent in an amount of from 0% to 50% and water in an amount of from 0.5% to 95%, preferably 1% to 95% by weight.

The coating composition can be coated onto the surface of an object selected from the group consisting of a metal, metal alloy, plastic, glass, human skin or animal skin. The object can also be a medical device for introduction into a human or animal body, which includes the hydrophilic coating composition on at least one surface of the device.

The medical device can be at least partially made of a metal or metal alloy consisting of stainless steel, nickel, nickel-cobalt, titanium, NiTi, tantalum, nitinol, rare earth metal, silver, gold, platinum, tungsten, combinations thereof or alloys or plated articles thereof.

The medical device can be at least partially made of polyurethane, polycarbonate, polyethers, polyesters, polyvinyl chloride, polystyrene, polyethylene, polyvinyl acetate, silicone rubbers, rubber latex, polyester-polyether copolymers, ethylene methacrylates, silicone, natural and synthetic rubbers, nylon, PEBAX, polyamide or combinations thereof.

The medical device can be at least partially made of glass such as optical glasses, optical lenses, polarizing glasses, mirrors, optical mirrors, prisms, quartz glass and the like.

In one embodiment, the medical device is coated by an aqueous coating composition according to the invention by dipping, brushing, flooding, spraying, electrolytic depositing, electrostatic spraying, electroplating, vacuum treatment, pressure treatment or combinations thereof.

The medical device can be in the form of a tube, capillary, wire, sheet, coil, rod, lattice or network of wires.

The medical device can be a surgical rod, a guidewire, a guidewire tubing, a coiled guiding tube, a coiled catheter, an expendable or non-expendable stent, an electrodal coil, a needle, a blade or similar metallic medical device.

The medical device can also be a tablet, a capsule, tubing, a capillary, a sheet, a fiber, a wound dressing, a suture thread, a balloon, a foil, a catheter, a urinary catheter, a guiding tube, a wound drain, a stent or a similar medical device.

In one embodiment, the auxiliary agent is at least one solvent selected from the group consisting of alcohols, alkylketones, arylalkylketones, ketoalcohols, cyclic ketones, heterocyclic ketones, ethers, cyclic ethers, esters, and the like and combinations thereof.

In another embodiment, the auxiliary agent is optionally chemically bonded and/or physically incorporated into the aqueous coating composition or incorporated into the finished hydrophilic coating on the surface of the object.

In yet another embodiment, the auxiliary agent is optionally a preservative selected from the group consisting of parabens, formaldehyde releasers, haloalkyls, haloalkynyls, alkyl acids, aryl acids, isothiazolinons, quats, zinc oxide, zinc organics, iodine, povidone-iodine, chlorhexidine, bronopol, triclosan, clotrimazol, miconazole, propiconazole, tebuconazole, tolnaphtate, clioquinol, colloidal silver, silver complexes and silver salts or combinations thereof.

In another embodiment, the auxiliary agent is optionally an antimicrobial agent selected from the group consisting of antibiotics, antiseptics, disinfectants including tetracyclines rifamycins, rapamycin, macrolides, penicilins, cephalosporins, beta-lactam antibiotics, aminoglycosides, chloramphenicol, sufonamides, glycopeptides, quinolones, ciprofloxacin, fusidic acid, trimethoprim, metronidazole, clindamycin, mupirocin, polyenes, azotes, fluconazole, beta-lactam inhibitors and the like.

In another embodiment, the auxiliary agent is optionally a therapeutical agent selected from the group consisting of analgesics, anti-inflammatory agents, topical antipuritics, anti-itch, non-steroids, acetaminophen, ethylsalicylic ester, camphor, bufexamac, ibuprofen, indomethacin, steroids such as hydrocortisone, desonide, triamcinolone acetonide, betamethasone valerate, betamethasone dipropionate, betamethasone benzoate, clobetasol propionate, halcinonide, desoximethasone, amcinonide, fluocinonide, fluandrenolide, alclometasone dipropionate, fluocinolone acetonide, diflorasone diacetate, mometasone furoate, fluorometholone, clocortolone pivalate, triamcinolone acetonide, halcinonide, dermatological agents, anthralin coal tar extract, keratolytic agent salicylic acid, urea, a local anaesthetic agent such as lidocaine, benzocaine, an anti-acne agent such as benzoyl peroxide, vitamin A derivatives, a wart removing agent such as salicylic acid, lactic acid, and the like; and other like agents and cyclodextrin complexes thereof.

In another embodiment, the auxiliary agent is optionally a drug selected from the group consisting of an anti-thrombogenic drug, or anti-thrombogenic agent, or stent restinosis preventing drug, including taxol, paclitaxel, paclitaxel derivatives, dexamethasone and derivatives, heparin and its derivatives, aspirin and hirudin, a nitric oxid drug derivative, a nitric oxide releasing drug, tacrolimus, everolimus, cyclosporins, sirolimus, angiopeptin and enoxaprin and the like or combinations thereof.

In another embodiment, the auxiliary agent is optionally a radiopaque compound selected from the group consisting of diatrizoate, iothalamate, metrizoate, iodipamide, triiodobenzoic acid, iothalamic acid, iopanoic acid, triiodophenyl acid, iodothalamic acid, iodine, iodides, bromine, perfluorooctyl bromide, barium sulfate samarium, erbium, bismuth trioxide, titanium oxide, zirconium oxide, gold, platinum, silver, tantalum, niobium, tungsten, gold, titanium, iridium, platinum or rhenium and combinations thereof.

In another aspect, the invention is directed to an aqueous coating composition, as described above, for providing the surface of an object with a durable antifog coating.

In one embodiment for the antifog coating, the surface of the object to be coated can include a metal, metal alloy, plastic or glass or a combination thereof. Preferably, the surface of object will become lubricious upon coating with the coating composition.

The metal or metal alloy object can be made of a metal or metal alloys selected from the group consisting of aluminum, magnesium, beryllium, iron, zinc, stainless steel, nickel, nickel-cobalt, chromium, titanium, tantalum, rare earth metal, silver, gold, platinum, tungsten, vanadium, copper, brass, bronze and the like or combinations thereof or plated articles thereof.

The plastic objects can be made of polymers selected from the group consisting of transparent or non-transparent polyurethane, polycarbonate, polyethers, polyesters, polyvinyl chloride, polystyrene, polyethylene, polyvinyl acetate, silicone rubbers, rubber latex, polyester-polyether copolymers, ethylene methacrylates, silicone, natural and synthetic rubbers, nylon, polyamide or combinations thereof.

The glass objects can be at least partially made of glass, such as optical glasses, optical lenses, polarizing glasses, mirrors, optical mirrors, prisms, quartz glass, ceramics and the like.

The antifog coating composition will preferably prevent the formation of water droplets on the surfaces of the metal, plastic or glass objects, thus providing the surfaces of the objects with anti-fog, anti-glare and lubricious properties.

The metal objects can include freezer doors, mirrors, condenser pipes, ship hulls, underwater vehicles, underwater projectiles, airplanes and the like.

The plastic objects can include face shields, helmet shields, swim goggles, surgeon face shields, food packaging plastic foil, greenhouse walls, greenhouse roofs, mirrors, wind shields, underwater moving objects, airplane window shields, passenger air-balloons and the like.

The glass objects can include window glasses, greenhouse glasses, glass sheets, face shields, optical glasses, optical lenses, polarizing glasses, mirrors, optical mirrors, prisms, quartz glass, parabolic antennas, automobile head beam light glasses, automobile windshields, airplane control light glasses, runway lights and the like.

In one embodiment for the antifog coating, the auxiliary agent is optionally a radiopaque agent. For sufficient x-ray visibility it is preferred that the radiopaque agent is present in an amount of up to 75% of the solids of the coating composition.

The radiopaque compound can be selected from the group consisting of diatrizoate, iothalamate, metrizoate, iodipamide, triiodobenzoic acid, iothalamic acid, iopanoic acid, triiodophenyl acid, iodothalamic acid, iodine, iodides, bromine, perfluorooctyl bromide, barium sulfate samarium, erbium, bismuth trioxide, titanium oxide, zirconium oxide, gold, platinum, silver, tantalum, niobium, tungsten, gold, titanium, iridium, platinum or rhenium and combinations thereof.

The metal, plastic and glass objects coated with the composition including the radiopaque compound will preferably have enhanced x-ray and radar visibility combined with anti-fog and lubricious properties. Objects having such a coating can include passenger balloons, weather balloons, small airplanes, RF-shields, small boats, lifebuoys, lifeboats, life rafts, and the like.

In yet another aspect, the invention is directed to an aqueous coating composition, as described above, for providing the surface of an object with a durable water-absorbable coating for a printing process.

In one embodiment of the water-absorbable coating, the surface of the object to be printed on consists of a metal, metal alloy, plastic, paper, glass, fiber, textile and the like.

The metal or metal alloy can be sheet metal, iron, aluminum, stainless steel, nickel, nickel-cobalt, titanium, silver, gold, platinum, zinc, brass, bronze, combinations thereof or alloys or plated articles thereof.

In one embodiment of the water-absorbable coating, the object to be printed on can be at least partially made of plastic, polyurethane, polycarbonate, polyethers, polyesters, polyvinyl chloride, polystyrene, polyethylene, polyvinyl acetate, silicone rubbers, rubber latex, polyester-polyether copolymers, ethylene methacrylates, silicone, natural and synthetic rubbers, nylon, polyamide or combinations thereof.

In one embodiment of the water-absorbable coating, the object to be printed on can include a foil, a transparent sheet or object, cellulose printing paper, polymeric paper, paper imitation, poster, hydrophobic paper preparations, cotton based textile, plastic based textile, woven material and the like.

In one embodiment of the water-absorbable coating, the object to be printed on can be totally or partially made of glass, such as glass sheets, windows sheets, glass doors, mirrors, prisms, quartz glass and the like.

The surface of water-absorbable coating can be printed using a printing device, such as an ink-jet printer.

Additional objects, advantages and novel features of the invention will be set forth in part in the description and examples which follow, and in part will become apparent to those skilled in the art upon examination of the following, or may be learned by practice of the invention. The objects and advantages of the invention may be realized and attained by means of the instrumentalities and combinations particularly pointed out in the appended claims.

DETAILED DESCRIPTION OF THE INVENTION

The present invention is directed to coating compositions containing a multifunctional polymeric carrier dispersed or emulsified in water, a hydrophilic water soluble organic polymer, a multifunctional colloidal metal oxide and a crosslinker for use in medical, anti-fog and ink absorbing applications.

Surface properties of objects in general greatly affect their interaction with fluids, water, the atmosphere, gases, and biological systems. Hydrophilicity of a surface changes drastically its physical, chemical and biological properties, e.g. lubricity or friction, wetability, water absorption, water release, fluid release, surface energy, surface area, visibility, compatibility, leaching, intended release of a substances, biostatic behavior, chemical reactivity, interaction with proteins and other molecules, adhesion or repellence of microorganisms or marine life, incrustation, sedimentation, calcification, antigenicity and biocompatibility. Considering the broad spectrum where hydrophilicity of the surface of a device, an object or a product can make a beneficial difference, it is understandable that the need for a durable, lubricious, hydrophilic coating system with good adhesion is needed in industry sectors such as medical devices, pharmaceutical preparations, anti-fog products, textiles, printing, and in water and air transportation.

Conveniently and advantageously, such a coating should be based on water as its majority of carrier solvent. The formulated coating should have good stability and shelf life. The coating process or application should be safe, cost and time effective without extensive equipment or surface preparation. The coating should not require use of an additional primer, thus being a one system coating composition. It should also be dry to the touch in a reasonable drying or curing time, preferably it should not require curing at elevated temperature. The coating should have good long-term adhesion and good stability over extended service time, and should be tough but flexible towards abrasion and substrate temperature or mechanical dynamics. In combination with good abrasion resistance, it should have extensive hydrophilicity with good long-term lubricity, anti-fog property, ink absorbing ability without blocking tendency. The cured coating should not leach or bleed out any undesired components, thus maintaining good transparency and making recycling of coated polymers without yellowing possible. Besides chemically bonding certain useful agents for biological or identification purposes, such a coating should also have the flexible architecture of encapsulating specific agents with time and concentration programmable release patterns for protective or therapeutic purposes. Moreover, the coating itself should have a reasonable toxicological profile thus being benign to the environment where its lubricity, controlled release, anti-fog or absorbing properties are intended.

Surprisingly, the unique coating composition of the present invention provides an improved coating for the criteria mentioned above.

The first aspect of the present invention is a aqueous coating composition for providing medical devices with a durable, hydrophilic, lubricious coating which includes:

a) a multifunctional polymeric carrier dispersed or emulsified in water and capable of forming a polymeric matrix;

b) a hydrophilic water-soluble organic monomer, oligomers, prepolymers, polymer or copolymer;

c) a multifunctional aqueous colloidal metal oxide;

d) a multifunctional crosslinker; and, optionally, e) at least one auxiliary agent for performance enhancement of the aqueous coating composition and/or the resulting hydrophilic coating of the said coated surface.

There are numerous paint and coating compositions known through prior art or through various trade journals of industry sector research and development. All coatings have in common that the physical, chemical or biological properties of coated areas are to be refined, e.g. protected from corrosion. The actual end use of a coating composition with the characteristic of the substrates to be coated determines the composition of the coating.

Besides a general solvent or water based polymeric matrix, e.g. polyurethane suitable for coating, silica based hydrophilic or hydrophobic oxides are used extensively primarily as thickeners in such formulation to provide "body," e.g. U.S. Pat. No. 3,939,260 in cosmetic formulations. However it was also recognized that specifically prepared colloidal silica has -OH groups available for reactions that lead to beneficial products, e.g. with aziridine, to substances for industrial water treatment as mentioned in U.S. Pat. No. 3,592,834 and U.S. Pat. No. 3,946,061.

Colloidal metal oxides used according to the present invention are well known and can be prepared, e.g. as colloidal silica or mixed colloidal silicas (e.g. alumina), from sodium silicate by careful acidification until a certain desired pH is reached. The average particle size usually ranges from 10 Å to 1000 Å. Preferably, the average particle size ranges from about 100 Å to 800 Å.

While not being bound by theory, it is believed that at least a portion of the colloidal metal oxide material is embedded within the coating composition and that at least a portion of the material reacts with the polymeric matrix and the crosslinker. It is believed that the hydroxyl groups in the colloidal metal oxide react with the polymeric matrix and the crosslinker to form a more durable coating. It is further believed that the metal oxide interacts with the substrate to be coated, resulting in better adhesion of the coating to the substrate. It is also believed that the colloidal metal oxide forms bubbles or hollows in the coating, which can absorb water, resulting in a higher capacity to absorb water and higher swellability.

Depending upon the application for the coating composition, either a single colloidal metal oxide can be used or a combination of different colloidal metal oxides can be used to improve adhesion to the substrate. It has been found, for highly polished surfaces, that using combinations of colloidal metal oxides results in improved adhesion over a single metal oxide. For example, a combination of colloidal silica and alumina results in better adhesion compared to using only silica. A combination of particular interest for increasing adhesion to a highly polished surface is collodial silica and alumina having a ratio of Al:Si of about 1:10.

Medical Application

The emphasis of the hydrophilic coating, e.g. a medical coating, is not on the protective aspect for the substrate but on the lubricity of the applied coating. In one of the first applied coatings according to U.S. Pat. No. 4,100,309 and U.S. Pat. No. 4,119,094 it was found that a solvent based polyurethane and/or polyisocyanate coating on a medical device could be made lubricious by grafting onto it a hydrophilic polymer, e.g. polyvinylpyrrolidone.

There are numerous different surgical procedures performed today, which require direct contact of various surgical instruments, medical devices and prosthetic implants with living tissues. The devices and instruments are made of many different metals, metal alloys or plated devices such as stainless steel alloys, NiTi or Nitinol, gold, silver, platinum, nickel, nickel-cobalt, titanium, tantalum, rare earth metal, tungsten or combinations. Similarly, plastic or polymeric medical devices which are made of polyurethanes, polycarbonates, polyethers, polyesters, polyvinyl chloride, polystyrene, polyethylene, polyvinyl acetate, silicone rubbers, rubber latex, polyester-polyether copolymers, ethylene methacrylates, silicone, natural and synthetic rubbers, nylon, PEBAX or polyamide are extensively used. These different materials require increasing attention regarding their lubricity since surfaces of such devices are usually hydrophobic.

They can seriously effect the handling or performance of a medical device or make it almost impossible to work with during introduction into a human or animal body or during removal after certain period of service in the body. It is desirable to provide such metal, plastic or elastomeric rubbery polymeric devices with a hydrophilic property on the surface to overcome the generally hydrophobic property of such substrates.

It is one object of this invention to provide a hydrophilic, lubricous coating for a medical devices, which exhibits a significantly reduced coefficient of friction when exposed to water, aqueous solutions or body fluid.

There have been a variety of coating compositions suggested to improve the coating quality for coatings containing a combination of a polymeric matrix or carrier with hydrophilic polymers. One significant improvement was the combination of the polymeric matrix or carrier with the hydrophilic polymer in a one step solvent based product as mentioned in U.S. Pat. No. 4,642,267. Many other lubricious coatings for medical devices became known over the years which followed this design of using a combination of a polymeric matrix or carrier with a hydrophilic polymer with moderate success or significant side-effects or drawback. In many examples a solvent based coating composition is suggested. Such coatings may cause environmental concern and makes handling a particular safety issue for the coating operators regarding emission of solvent vapors from the coating composition during the coating process. Another drawback can be the effect of the solvent or solvent composition of a solvent based coating composition to the actual medical device. The device might become irreversibly deformed during exposure to the solvents or it might get etched thus making the intended performance of the device questionable.

It is another object of this invention to provide a one step aqueous composition of a hydrophilic, lubricous coating for a medical device, which exhibits a significantly reduced coefficient of friction when exposed to water or aqueous solutions or body fluids.

The nature of the polymeric matrix or carrier and the hydrophilic polymer has been vastly varied over the last twenty years. It has to be mentioned that the choices of solvent based polymers suitable as carriers according to the present invention are different from the solvent based polymers. For example certain chemical functionalities such as free isocyanate groups have only a reasonable stability in solvent based coating compositions. The aqueous coating composition according to the present invention focuses on dispersed or emulsified polymeric carriers, which are preferably multifunctional, modified polymeric urethanes, ureas, esters, ethers, carbonates, vinyls, acrylics, methacrylics, alkyds, acrylamides, maleic anhydride, epoxy prepolymers, combinations thereof or water-based dispersed or emulsified polymers which are derived from the paint and coatings technology and are toxicologically acceptable.

This object of invention is accomplished by combining the aqueous polymeric carriers of the composition of the present invention with hydrophilic polymers such as hydrophilic organic monomers or oligomers, prepolymers and copolymers derived from the group consisting of vinyl alcohol, N-vinylpyrrolidone, N-vinyl lactam, acrylamide, amide, styrenesulfonic acid, combination of vinylbutyral and N-vinylpyrrolidone, hydroxyethyl methacrylate, acrylic acid, vinylmethyl ether, vinylpyridylium halide, melamine, maleic anhydride/methyl vinyl ether, vinylpyridine, ethyleneoxide, ethyleneoxide ethylene imine, glycol, vinyl acetate, vinyl acetate/crotonic acid, methyl cellulose, ethyl cellulose, carboxymethyl cellulose, hydroxyethyl cellulose, hydroxypropyl cellulose, hydroxymethyl ethyl cellulose, hydroxypropylmethyl cellulose, cellulose acetate, cellulose nitrate, starch, gelatin, albumin, casein, gum, alginate, hydroxyethyl (meth)acrylate, hydroxypropyl (meth)acrylate, ethylene glycol (meth)acrylates (e.g. triethylene glycol (meth)acrylate) and meth)acrylamide), N-alkyl (meth) acrylamides (e.g. N-methyl (meth)acrylamide and N-hexyl (meth)acrylamide), N,N-dialkyl (meth)acrylamides (e.g.N, N-dimethyl (meth)acrylamide and poly-N,N-dipropyl (meth)acrylamide), N-hydroxyalkyl (meth)acrylamide polymers, such as poly-N-methylol (meth)acrylamide and poly-N-hydroxy ethyl (meth)acrylamide, and N,N-dihydroxyalkyl (meth)acrylamide polymers, such as poly-N,N-dihydroxyethyl (meth)acrylamide, ether polyols, polyethylene oxide, polypropylene oxide, and poly(vinyl ether), alkylvinyl sulfones, alkylvinylsulfone-acrylates and related compounds or a combination thereof.

It is another object of this invention to provide a one step hydrophilic, lubricous coating for a medical devices, which exhibits a significantly reduced coefficient of friction when exposed to water, aqueous solutions or body fluid and has improved stability during storage, improved performance during application or improved properties of the hydrophilic film on the medical device during service. The composition of the medical coating according to the present invention contains optionally at least one co-mingling homogeneously mixed auxiliary agent or coating aid including, but not limited to, the following: solvents, surfactants or wetting agents, emulsifiers, dyes, pigments, colorants, UV absorbers, radical scavengers, antioxidants, anti-corrosion agents, optical brighteners, fluorescers, bleaches, bleach activators, bleach catalysts, non-activated enzymes, enzyme stabilizing systems, chelants, metal catalysts, metal oxide catalysts, organometallic catalysts, film forming promoters, hardeners, linking accelerators, flow agents, leveling agents, defoaming agents, lubricants, matte particles, Theological modifiers, thickeners, conductive or non-conductive metal oxide particles, magnetic particles, anti-static agents, pH control agents, perfumes, preservatives or combinations thereof.

It is another object of the present invention to provide a durable, hydrophilic, flexible, lubricious coating which retains its lubricity when wetted after prolonged contact with water, aqueous solutions, or body fluids and, after repeated moistening/drying cycles, has improved abrasion resistance and improved adhesion to the most difficult to coat surfaces of medical devices without requiring in most cases an additional primer, and which is benign in its toxicological behavior toward the surgical environment where the coated devices are placed into the human or animal body.

Surprisingly, it was found with the coating composition of the present invention for medical devices that the addition of a multifunctional aqueous colloidal metal oxide and a multifunctional crosslinker did not retard the lubricity of the resulting hydrophilic coating.

To the contrary the lubricity was improved significantly. Furthermore, the durability and the abrasion resistance surprisingly increased significantly. Furthermore, surprisingly, the adhesion to metallic or plastic substrates improved significantly.

Such aqueous colloidal metal oxides or colloidal metalate oxides of the coating composition according to the present invention are derived from the metals aluminum, silicon, titanium, zirconium, zinc, tin or silver and related colloidal metal oxides or a combination thereof, or aluminates, silicates, titanates, zirconates, zincates, stannates, argentates or combinations thereof.

The multifunctional crosslinkers of the coating composition of the present invention can include multi-functional aziridine, carbodiimide, oxirane, alcohol, glycydyl ether, glycidyl ester, carboxyl compound, amine, epoxide, vinyl sulfone, amide, allyl compound and related hardener, their prepolymeric resins and combinations thereof.

The multifunctional aziridine can include trimethylolpropane tri-[.beta.-(N-aziridinyl)-propionate, 2,2-bishydroxymethyl butanoltris[3-(1-aziridine) propionate], aziridine-2-methylol acrylate, aziridine-2-methylol methacrylate, N-(2-aziridinyl)methylacrylamide, N-(2-aziridinyl)-methylmethacrylamide, 1-(aziridin-2-yl)-2-oxabut-3-ene, 4-(aziridin-2-yl)-but-1-ene, 5-(aziridin-2-yl)-pent-1-ene, and the like and their related prepolymeric resins or combinations thereof.

The multifunctional carbodiimide can include carbodiimide, carbodiimide derivatives, chemically related crosslinkers and their prepolymeric resins and combinations thereof.

The multifunctional polyhydric alcohols can include glycerin, pentaerythridol ethylene glycol, diethylene glycol, triethylene glycol, tetraethylene glycol, polyethylene glycol, 1,2,3-propanetriol, polyglycerol, propylene glycol, 1,2-propanediol, 1,3-propanediol, trimethylol propane, diethanolamine, triethanolamine, polyoxypropylene oxyethylene-oxypropyle block copolymer, sorbitan fatty acid esters, polyexyethylene sorbitan fatty acid esters, pentaerythritol, and sorbitol; polyglycidyl ether compounds, such as ethylene glycol diglycidyl ether, polyethylene glycol diglycidyl ether, glycerol polyglycidyl ether, diglycerol polyglycidyl ether, polyglycerol polyglycidyl ether, sorbitol polyglycidyl ether, pentaerythritol polyglycidyl ether, propylene glycol diglycidyl ether, and propylene glycol diglycidyl ether or a combination thereof.

The multifunctional amines or polymeric amine can include melamine, hexamethylendiamine, hexamethylentetramine, guanidine and the like and combinations thereof.

The coating composition according to the present composition contains optionally a solvent such as but not limited to alcohols, alkylketones, arylalkylketones ketoalcohols, cyclic ketones, heterocyclic ketones, ethers, cyclic ethers, esters, and the like and combinations thereof.

The surfaces to which the coating composition of the present invention shows improved lubricity, improved durability, improved abrasion resistance and improved adhesion are from medical devices made of metals, alloys, plastics or polymers or glass such as stainless steel, nickel, nickel-cobalt, titanium, NiTi, tantalum, nitinol, rare earth metal, silver, gold, platinum, tungsten, combinations thereof or alloys or plated articles thereof or polyurethane, polycarbonate, polyethers, polyesters, polyvinyl chloride, polystyrene, polyethylene, polyvinyl acetate, silicone rubbers, rubber latex, polyester-polyether copolymers, ethylene methacrylates, silicone, natural and synthetic rubbers, nylon, PEBAX, polyamide or combinations thereof. The medical devices can be at least partially made of glass, such as optical glasses, optical lenses, polarizing glasses, mirrors, optical mirrors, prisms, quartz glass and the like.

Typical polymeric materials of such medical devices include thermoplastic polyurethanes, polyesters such as polyethylene terephthalate (PET), nylon polymers such as nylon-11 and nylon-12, block copolymers of polyether and polyester polymers (HYTREL) block copolymers of polyether polymers and polyamides (PEBAX resin series, available from ATOCHEM), polyimides, polyolefins such as polyethylenes (PE) and polypropylenes (PP), synthetic hydrocarbon polymers, such as SBR, EPDM, including thermoplastic hydrocarbon polymers (KRATON, available from SHELL), as well as natural rubber. For catheter applications used in angioplasty, components made from TPU, PET, nylons 11 and 12, HYTREL, PEBAX, and PE are preferred polymeric substrates. For catheter balloons used in coronary angioplasty preferred polymeric substrates are PET, nylons and PE.

Furthermore, suitable polymeric substrates include, but are not limited to, polyacrylates and methacrylates (i.e., polymethylmethacrylate, polymethylacrylate, polybutylmethacrylate, etc.); polyolefins (polyethylene, polypropylene, polybutadiene); styrene-butadiene copolymers; ethylene propylene copolymers, styrene-ethylene/butadiene/styrene block copolymers; polycarbonates; fluorocarbon polymers (i.e., polyvinylidene fluoride-PVDF, polytetrafluoroethylene (PTFE), polyperfluoroethylenepropylene-FEP); polysiloxanes; various aliphatic and aromatic polyurethanes, including polyurethane polyester or polyether block copolymers; polyvinyl chloride; various polyesters, including polyethylene terephthalate (PET); polycarbonate/polydimethylsiloxane copolymers; and the like.

Examples of medical devices include, but are not limited to, tubings, capillaries, wires, sheets, coils, rods, lattices and network of wires, such as a surgical rod, a guidewire, a guidewire tubing, a coiled guiding tube, a coiled catheter, an expendable or non-expendable stent, an electrodal coil, a needle, a blade or similar metallic medical devices, as well as a carrier for pharmaceuticals or veterinarian preparations, a tablet hull, a capsule, a tubing, a capillary, a sheet, a fiber, a wound dressing, a suture thread, a balloon, a foil, a condom, a catheter, a urinary catheter, a guiding tube, a wound drain, a stent and other medical devices. Furthermore, the coating composition of the present invention can be formed into tough, hydrophilic, lubricious, flexible films or fibers of various thicknesses including woven material suitable for the use as wound protective material, films, wound covers, skin substitutes, tissue substitute or artificial skin for humans or animals. It can also be formed into medical disks and other shapes for movement support between joints.

More specifically, typical medical devices which can be coated with the coating composition according to the present invention are medical tubings, wound drains, guiding tubings, guidewires, stents and high pressure balloons to expand stents, surgical instruments and implements, e.g., probes, retractors, tissue and vessel separators, irrigation and aspiration tools, phacoemulsification tools, sponges, hemostats, clamps, blades including scalpel blades, gloves, lens glides, positioning tools, catheters, forceps, insertion tools, staples, sutures, and the like.

Additional suitable medical devices can include hard and soft contact lenses, stents, wires, guide wires, intravenous and central venous catheters, laser and balloon angioplasty devices, vascular and heart devices (tubes, catheters, balloons), ventricular assists, blood dialysis components, blood oxygenators, urethral/ureteral/urinary devices (Foley catheters, stents, tubes and balloons), airway catheters (endotracheal and tracheostomy tubes and cuffs), enteral feeding tubes (including nasogastric, intragastric and jejunal tubes), wound drainage tubes, tubes used to drain the body cavities such as the pleural, peritoneal, cranial, and pericardial cavities, blood bags, test tubes, blood collection tubes, vacutainers, syringes, needles, pipettes, pipette tips, blood tubing.

Implants which may be modified according to the present invention include, but are not limited to, vascular grafts, soft and hard tissue prostheses including, but not limited to, pumps, electrical devices including stimulators and recorders, auditory prostheses, pacemakers, artificial larynx, dental implants, mammary implants, penile implants, cranio/facial tendons, artificial joints, tendons, ligaments, menisci, and disks, artificial bones, artificial organs including artificial pancreas, artificial hearts, artificial limbs, and heart valves.

Hydrophobic surfaces of medical devices can cause tissue and cell adhesion, inflammation, thrombogenicity, hemolysis, bacterial and fungal adhesion and infections, unwanted mineral deposits and increased pain. More and more such coatings are incorporating multi-functionalities which go beyond only lubricity.

It is another object of the present invention to provide a lubricious coating to a medical device which decreases cell adhesion, thrombogenicity, hemolysis, bacterial and fungal adhesion and infections, unwanted mineral deposits and/or a coating or coating system, which is suitable for drug delivery including drug release with a distinct release profile depending on the effective dosage requirement over time for the individual medical device. The coating is applied to simultaneously provide a durable, hydrophilic, lubricious coating with good adhesion to the substrate and good abrasion resistance.

A drug, preservative, biocide, pesticide, anti-fouling agent, bactericide, germicide, disinfectant, fungicide, bioeffecting agent, antimicrobial, algicide, vitamin, therapeutic agent or a combination thereof can be incorporated by simply mixing it into the coating composition of the present invention prior to coating of the medical device according to the intended therapeutic quantity and release time/concentration profile. Release time and concentration can be programmed by a coating system of more than one coating of different compositions.

A drug, preservative, biocide, pesticide, anti-fouling agent, bactericide, germicides, disinfectant, fungicide, bioeffecting agent, antimicrobial, vitamin, therapeutic agent or a combination thereof can also be incorporated by coating the medical device first with the composition according to the present invention, allowing the coating to dry or cure and then applying an aqueous or other convenient solution of the drug or said agent by dipping the coated device into the solution for a predetermined time.

Surprisingly, it was found that the solution uptake of a coating according to the invention, based on the weight difference, increased by about 100% in comparison to a previously known lubricious polyurethane/polyvinylpyrrolidone medical coating of comparable percentage of solids.

Examples of the preservative, biocide, pesticide, antifouling agent, bactericide, germicide, disinfectant, fungicide, include a substance selected from the group consisting of parabens, formaldehyde releasers, haloalkyls, haloalkynyls, alkyl acids, aryl acids, isothiazolinons, quats, zinc oxide, zinc organics, iodine, povidone-iodine, chlorhexidine, bronopol, triclosan, clotrimazol, miconazole, tolnaphtate, clioquinol, colloidal silver, silver complexes and silver salts or combinations thereof.

Antimicrobials incorporated into the composition of the present invention can include antibiotics, antiseptics, disinfectants including tetracyclines, rifamycins, rapamycin, macrolides, penicilins, cephalosporins, beta-lactam antibiotics, aminoglycosides, chloramphenicol, sufonamides, glycopeptides, quinolones, ciprofloxacin, fusidic acid, trimethoprim, metronidazole, clindamycin, mupirocin, polyenes, azotes, fluconazole, beta-lactam inhibitors and the like.

Examples of therapeutical agents incorporated into the coating composition according to the present invention can include analgesics, anti-inflammatory agents, topical antipuritics, anti-itch, non-steroids, acetaminophen, ethylsalicylic ester, camphor, bufexamac, ibuprofen, indomethacin, steroids such as hydrocortisone, desonide, triamcinolone acetonide, betamethasone valerate, betamethasone dipropionate, betamethasone benzoate, clobetasol propionate, halcinonide, desoximethasone, amcinonide, fluocinonide, fluandrenolide, alclometasone dipropionate, fluocinolone acetonide, diflorasone diacetate, mometasone furoate, fluorometholone, clocortolone pivalate, triamcinolone acetonide, halcinonide, dermatological agents, anthralin coal tar extract, keratolytic agent salicylic acid, urea, a local anaesthetic agent such as lidocaine, benzocaine, an anti-acne agent such as benzoyl peroxide, vitamin A derivatives, a wart removing agent such as salicylic acid, lactic acid, and the like; and combinations thereof and cyclodextrin complexes thereof.

Examples of an anti-thrombogenic drug or anti-thrombogenic agent or stent restinosis preventing agent, or an anti-proliferative drug are taxol, paclitaxel, paclitaxel derivatives, dexamethasone and derivatives, heparin and its derivatives, tacrolimus, everolimus, cyclosporins, sirolimus (rapamycin), aspirin and hirudin, a nitric oxid drug derivative, a nitric oxide releasing drug to reduce restinosis, angiopeptin and enoxaprin pyrolitic carbon, silicon carbon, and the like or combinations thereof.

The coating composition of the present invention optionally can contain anti-incrustation or calcification agents for coating medical devices, e.g. a urinary catheter. Examples of such agents are sodium citrate, preferably silver citrate with a double benefit of anti-microbial and anti-crustation or anti-calcification action.

It is another object of the present invention to provide a durable lubricious coating for a medical device which becomes more visible under x-ray condition where better visibility of the medical device is desired due to its material, its design or due to its small physical dimensions.

In this regard, the lubricious coating composition according to the present invention can contain a radiopaque agent which is chemically bonded into the coating composition such that it is not leached out. For sufficient x-ray visibility the radiopaque agent is up to 75% of the solids of the coating composition.

Examples of optional radiopaque agents in the coating composition of the present invention include, but are not limited to, diatrizoate, iothalamate, metrizoate, iodipamide, triiodobenzoic acid, iothalamic acid, iopanoic acid, triiodophenyl acid, iodothalamic acid, iodine, iodides, bromine, perfluorooctyl bromide, barium sulfate, samarium, erbium, bismuth trioxide, titanium oxide, zirconium oxide, gold, platinum, silver, tantalum, niobium, tungsten, gold, titanium, iridium, platinum, rhenium or combinations thereof.

The aqueous coating composition of the present invention can be applied to a medical device by dipping, brushing, flooding, spraying, electrolytic depositing, electrostatic spraying, electroplating, vacuum treatment, pressure treatment or combinations thereof.

The coating thickeness can vary depending upon the application. Typically the coating thickness of the coating composition is between about 0.1 microns to about 100 microns, preferably about 0.5 to about 50 microns.

It is another object of the present invention that the aqueous coating composition of the present invention can easily be dried or cured in most cases of application at ambient temperature rather than at elevated temperature. If acceptable to the substrate, the coating is preferably dried in about 2 to 3 minutes at a temperature in the range of about 70° C. to about 120° C. The coating can also be dried at ambient temperature, i.e. about 23° C., if needed.

Other coating systems have been suggested which include a primer and a topcoat. The primer in such a case is tailored to the individual substrate in order to achieve sufficient adhesion of the hydrophilic topcoat. The application of such a system is more time consuming and requires additional research efforts to tailor the primer to the various commonly used materials of medical devices. Secondly, a layered coating system requires additional attention to the compatibility of the topcoat with the primer.

A number of examples of prior art hydrophilic coatings also suggest to pretreat surfaces of medical devices by various physico-chemical methods, e.g. corona application or gamma ray grafting, in order to make the substrate more compatible or reactive to the lubricious topcoat and achieving in this way sufficient adhesion. Such treatments require additional costly equipment and might negatively effect the medical device in its intended use.

There is a great need for a one-step, universal, easy to apply, aqueous coating composition which modifies the surfaces of such devices and materials to achieve the desired surface properties with a durable, lubricious coating, having superior adhesion to the hydrophobic substrates, but which does not influence or compromise the intended use or performance of the device over extended periods of time.

Thus, in one embodiment, the universal aqueous coating composition of the present invention can easily be applied by a one step coating process which modifies the surfaces of such devices and materials and achieves the desired surface properties with a durable, lubricious coating, having superior adhesion to the hydrophobic substrates, without compromising the intended use or performance of the device over extended periods of time.

In one embodiment the present invention may be used to treat a device so that the treated surface has an extremely low surface tension. The present invention can be used to treat the surfaces of a wide variety of materials including plastics, polymers, ceramics, metals and composite materials.

In one embodiment, the device modified with the present invention can be implanted into living tissue with a minimum of side effects. For example, a vascular stent can be treated according to the present invention to increase the hydrophilicity of the exterior surface of the stent or to add phospholipids or other biofunctional molecules to the exterior surface of the stent. This stent may also be modified to contain drugs and anticoagulation agents (heparin, warfarin, etc.) to minimize clotting near damaged tissues and reduce the risk of bleeding elsewhere. This stent may be implanted into a blood vessel. While not wanting to be bound by this hypothesis, it is believed that the treated vascular stent causes a minimum of thrombogenic events due to decreased platelet adherence when compared to untreated vascular stents. Thus, the present invention provides a unique method for producing permanent tissue protective surface modifications on polymeric, metallic, ceramic and composite materials. The present invention improves many prior art medical devices by minimizing damage and harmful side effects resulting from detrimental tissue and cell interactions with surfaces, and reduces tissue trauma and infections caused by surface adhesions inherent in most plastics, polymers and metals.

In one embodiment of the present invention, coated medical instruments and devices are smooth, lubricious, and nonadherent to cells and tissues. In this embodiment of the present invention, coated medical instruments and devices exhibit reduced abrasion and friction with sensitive bodily tissues such as blood cells, vascular endothelium, peritoneum, pericardium, and the fragile surfaces of the respiratory system including tissues such as the lining of the trachea, the urinary system including the urethra and ureter, the gastrointestinal system, and the cardiovascular system, thereby minimizing tissue damage and potentially associated, life-threatening problems. In addition, surfaces modified according to the present invention are less likely to promote the occurrence of infectious bacteria and other harmful microorganisms which cause post-operative blood clotting, infection, and infection-related complications.

Industrial Slip and Anti-Fog Application

It is also known to use hydrophilic polymer coatings to reduce moisture fogging and/or to reduce glare. There are numerous examples of polymeric compositions which have moderate anti-fog properties. Usually the most effective of these coatings so far known, use soluble polymers and surfactants, which have a short life since they wash off. Polymeric anti-fog coatings, which are less hydrophilic, though more permanent, have limited anti-fogging properties. Coatings for the service under year around open weather conditions require particular attention to stability, adhesion, long lasting hydrophilic property and abrasion resistance. In particular when plastic sheeting from greenhouses is considered for recycling, it is necessary to provide a composition of a hydrophilic coating which does not cause yellowing at extrusion temperatures when mingled and extruded together with virgin material.

The use of a hydrophilic coating according to the present invention onto the surface of a general industrial and consumer article has a number of benefits. Surfaces coated according to the present invention are capable of spreading water, and thus preventing the formation of water droplets on the surface of the article which is of particular need and desire for a variety of applications. Transparent plastics used in misty or humid environments, such as greenhouses, should avoid the formation of water droplets on the transparent plastics. Water-spreading surfaces on these materials helps to make them more transparent and avoids undesirable streaking. Secondly, they prevent the dripping of water which becomes contaminated in the greenhouse climate by spores of bacteria and fungi and could fall onto the plants without proper water sheeting of the plastic, thus infecting the plants.

Water-sheeting is also desired in a number of automobile and traffic sign application during rain. The hydrophilic coating according of the present invention provides an anti-fog and water sheeting effect of high durability and temperature stability, good adhesion with good transparency to avoid to a large extent the impairment of the light emitted from behind a protective glass shield. Dew and fog is another form of precipitation that affects light transmission on automobile and traffic signs.

There are numerous other instances where the value of optically clear articles would be enhanced if the tendency of the articles to cause glare or to be obscured by the formation of fog on a surface of the article could be reduced. For example, protective eyewear (goggles, face shields, helmets, etc.), ophthalmic lenses, architectural glazings, decorative glass frames, motor vehicle windows and windshields may all reflect light in a manner that causes an annoying and disruptive glare. Use of such articles may also be detrimentally affected by the formation of a moisture vapor fog on a surface of the article.

Mirrors on the other hand loose reflection capability if fogged up thus impairing the function of mirrors.

There is also a need for decreasing the friction of certain articles or constructions which are for extended periods of time in partial or in complete contact with water. The smoothness of their surfaces affects friction and therefore the efficiency and speed. For example, treatment of fishing lines or treatment of the hull of a ship with a coating according to the present invention is beneficial, in particular treatment of hulls of sailboats and speedboats. A ship hull surface treated in this manner exhibits increased speed due to decreased friction with water. In return, the fuel consumption can be significantly reduced. A ship's hull can also be treated according to the present invention to prevent the adherence of barnacles. Enhanced performance of such a coating is achieved with additional anti-foulant agents incorporated into the coating prior to application. Completely submerged articles, devices, vehicles or trajectories can also be improved in their underwater velocity. Other types of motor vehicles such as automobiles, trucks, and airplanes would also become more efficient with a friction reducing coating.

Absorbable Substrates for Durable Printing Images and for Highly Wettable Surfaces It is known to use coatings to provide a surface on a hydrophobic substrate such as a plastic, e.g. polyolefin, film having improved printability. The coatings generally provide a hydrophilic surface or water absorbing surface to allow penetration of a water based ink. However, many of the known coatings are not durable, do not provide for sharp printed images or do not dry adequately to avoid smearing of the image.

The present invention provides a hydrophilic coating formulation which absorbs water based inks and dyes and provides a tough, durable and printable surface on metallic, paper, textile, and plastic substrates.

Thus, the present invention also provides methods and compositions for treating surfaces of fabrics and papers. After treatment according to the present invention, the surface of the fabric or paper is highly wettable. This has great utility where wetability of the surface of the fabric or paper is advantageous. Such uses include, but are not limited to, towels, washcloths, gauze pads, bandages, surgical towels, surgical drapes, diapers, incontinence devices and clothing, sanitary napkins, paper napkins, bed sheets, the interior of surgical uniforms and scrubs, the interior of many types of clothing, and the like.

In sum, the surfaces coated with the composition according to the present invention provide medical devices with a durable highly lubricious coating and optionally can be used as carrier for drugs, therapeutic or bio-effecting agents or chemically bonded radio-opaque substances. The coating according the present invention has superior adhesion to a number of substrate with good durability. Water droplets on such hydrophilic surfaces show extremely low contact angles thus making the coating composition suitable as anti-fog coating combined with high abrasion resistance. Coated surfaces of plastics have high transparency and thus good light transition and low yellowing effect in a recycling process. Surfaces coated with the formulation according to the present invention also show enhanced water absorbance thus making the coating suitable as a carrier for inks in a printing process.

EXAMPLES

The following non-limiting examples have been carried out to illustrate preferred embodiments of the invention. These examples include the preparation of coating compositions according to the invention, analysis of the coatings and testing of the coatings.

1. Test Methods

Visual Performance Assessment

The substrate is rinsed with water, while the panel is held at a 90° angle to horizontal, and the panel is judged to determine whether it exhibits sheeting, curtaining, or beading. "Sheeting" is when an even film of water covers the substrate, and slowly dries down without developing breaks in the film. "Curtaining" occurs when the water slowly pulls into the middle and drains off the substrate. Performance is judged to be "beading" when the water shows no affinity for the surface, and quickly runs off the substrate.

Viscosity Test

All measurements were performed with a Brookfield RVDV II+ rotational viscometer available from Brookfield Engineering Labs, Inc., Stoughton, Mass., USA. The recommended procedure is followed, with the following exceptions. The recommended procedure is varied by using a smaller vessel and removing the guard leg. The calibration is to be determined using a 600 ml low form griffin type beaker with Glycerin (1400 cp) and olive oil (80 cp) at 100 RPM. All subsequent measurements are performed in 50 ml beakers at 100 RPM with the appropriate spindle.

Contact Angle

As used herein, the term "hydrophilic" describes surfaces which are wetted by DI water deposited onto the surface. The state of the art respecting wetting of materials allows definition of hydrophobicity (and wetting)in terms of contact angles and the surface tension of the liquids and solids involved. This is discussed in detail in the American Chemical Society Publication entitled "Contact Angle, Wettability, and Adhesion edited by Robert F. Gould and copyrighted in 1964.

The test for determining the contact angle was conducted by wetting polycarbonate as a representative surface. Water as the representative liquid was placed on the representative surface. The contact angle between the liquid and the surface is less than 90° or when the liquid will tend to spread spontaneously across the surface. Both conditions normally coexisting. The water is brought on to the surface to be tested by a syringe needle. Method and read-out was conducted according to the CAM-MICRO equipment supplied by Tantec, Inc. This test was used as general evaluation criteria for formulations of mentioned examples and comparative examples to determine the hydrophilic properties of compositions of the present invention. This method is suitable for evaluating hydrophilic coating properties in medical, anti-fog and printing applications.

Application of Compositions

Examples of compositions of the present invention and comparative examples were usually applied by dipping, brushing, spray-coating, electrolytic depositing or by a roller for general coating or by a wire bar for specific coating thickness. These applications are suitable for medical coatings, anti-fog and printing applications.

Uniformity/Hydrophilic Properties

To check the even distribution of a hydrophilic coating the staining test with an aqueous solution of Crystal Violet is conducted by dipping the coated sample into the solution. In some cases a 1% iodine solution was used for staining and evaluating the uniformity of the coating.

The preferred uniformity test for medical coatings, anti-fog coatings and ink-absorbing tests are conducted with crystal violet solution.

Durability Testing

Durability tests were conducted primarily in two ways. Byk Gradner supplies equipment and test description which was used for evaluating the abrasion resistance of hydrophilic coatings. Test method 18.1.1 of catalog 90 allows variations regarding rubbing force, rubbing tool (brush or sponge), number of rubbing cycles with or without water. Cycles usually run between 100 and 1500 with evaluation stop every 100 cycles. The cycle of 2 passes was 1332 in/min. After the abrasion test the remaining coating becomes visible by staining it with the crystal violet solution. The estimated % degree of non-stained area allows relative conclusions regarding the improvement of durability of the coating.

A second series of abrasion tests were run on a series of test formulations to compare the durability of known coating technology versus the durability of applied compositions according to the present invention. An Arrow mixer was inverted and clamped to a ring stand. A drill bit was fashioned with a circular end and inserted into the mixer. To this end a circular Scotch cleaning pad was affixed. At a height, 5 mm below the Scotch pad a ring was secured around the pad and clamped to the ring stand. The pad was wetted with DI water and a coated coupon; formula variant was placed across the ring. The placement was such that the middle of the coupon was slightly imbedded into the pad. On top of the coupon was placed a 389 g weight. The mixer was run for two minutes at 300 RPMs.

After all of the coupons were abraded, they were placed side by side on white corrugated medium. A light was placed at a 60° angle to the coupon. Each was then evaluated for the degree of abrasion, durability and adhesion. They were scored as excellent, good, fair or poor.

Coefficient of Friction

The tester consists of a friction machine and a computer. The pull with which a sled is dragged over a coated surface with or without water contact is recorded and compared in a chart with the uncoated sample. The tester allows automatic data collection with Zero setting. The sled further may contain a foam pad. The wetted test samples are pulled according to settings and pulling forces which are recorded by a computer print-out chart. Formulation improvements of lubricity of coatings or low residual friction of hydrophilic coatings for medical devices according to the present invention reveal. The coating was tested in reference to ASTM D 1894-87 Standard Test Methods for Static and Kinetic Coefficients of Friction of Plastic Film and Sheeting.

Adhesion Test

Coated substrate according to the present invention are scribed by 5×5 cross cuts. An adhesive tape 3M Type 610 is firmly pressed onto the cuts and peeled of. The degree of coating peel-off is used in a relative comparison of improved compositions of the present invention. Adhesion of medical coating and anti-fog coating can be evaluated.

Yellowing Tendency/Recycling

Coated samples are tested for yellowing tendency at 270° C. for 10 min. Yellowing was recorded visually. Suitability for recycling of previously coated polycarbonate sheets where grinded and mixed up to 30% by weight with virgin material for re-extrusion. Recycling applies primarily to anti-fog applications.

Immersion Weight Gain Test

Coatings of various compositions were dried at room temperature over night or cured at 70° C. for 10 minutes and checked for their water uptake capacity by determining the weight differences between known compositions and compositions of the present invention before and after immersion in water. This test applies primarily to the drug loading capacity and ink absorbing ability of coatings of the present invention.

Condensation Test/Anti-Fogging Test Method

Anti-fog coatings are evaluated according to the hot fog test: A 250 mL glass beaker, containing about 50 mL of water and covered with the film to be evaluated, is immersed to about ½ of its height in a water bath at 70° C. Coatings are observed at defined intervals from the start of the experiment and a conventional notation ranging from Exellent, Very good, Good, Modest and Poor is assigned.

A second test method was designed to check the performance of comparative anti-fog formulations. A cold frame about 100 cm×100 cm covered with a divided glass structure and slanted by about 10° towards south was place over typical moist compost containing garden soil in late spring. Condensed water formation was repeatedly observed on the inside and outside of the untreated glass cover over several periods of 24 hours blocking the view into the cold frame almost completely. The water droplet formation also caused undesired shading. The glass construction was dried before each 24 hour observation period. Then one half of the glass construction was treated on both sides by brushing with a conventional water-based anti-fog composition and let dry without special curing. The second half of the glass cover was coated with the composition of the present invention and let dry without special curing. Both sides functioned satisfactory for about 24 hours. However, the conventional formulation turned opaque and lost significant anti-fog performance over a few days. The other half coated with the composition of the present invention stayed clear, did not turn opaque and prevented droplet formation inside and outside over weeks.

Water Sheeting/Sheeting Durability

Glass sheets are coated with two comparative anti-fog compositions side by side or part of the sheet is left uncoated. At an angle of about 45° a water spray covering both areas is applied for extended period of time. Sheeting duration, leaching tendency and opaqueness is recording for the evaluation of anti-fog compositions according to the present invention.

Ink-Jet Printing Test

Tests were conducted with regular printing paper, aluminum foil, polyethylene foil and transparency foils commonly used for overhead projections in presentations. Water-based ink jet technology was used to compare coated and uncoated ink absorbing capacity as well the image and fond clarity evaluation by stereomicroscope comparison. An additional thumb rub test on printed areas in comparison to unprinted areas was conducted.

Formulation and Use Levels

The aqueous coating composition according to the present invention for providing the surface of an object with a durable hydrophilic coating includes multifunctional polymeric carrier dispersed or emulsified in water and capable of forming a polymeric matrix, a hydrophilic water-soluble organic monomer, oligomers, prepolymers, polymer or copolymer, a multifunctional aqueous colloidal metal oxide, a multifunctional crosslinker, and, optionally, at least one auxiliary agent for performance enhancement of the aqueous coating composition and/or the resulting hydrophilic coating of the said coated surface. The coating composition can also include a radiopaque agent for enhanced X-ray visibility.

The dispersed or emulsified multifunctional polymeric carrier concentration is from 0.01% to 42% preferably from 0.5% to 15%. The hydrophilic water-soluble organic monomer, oligomers, prepolymers, polymer or copolymer concentration is from 0.001% to 25% preferably from 0.25% to 10%. The multifunctional aqueous colloidal metal oxide concentration is from 0.01% to 25% preferably from 0.25% to 20%. The multifunctional cross linker concentration is from 0.001 to 8% preferably from 0.01% to 3%. The concentration of the auxiliary agent for performance enhancing is from 0.001% to 10% preferable from 0.01% to 5%. The concentration organic solvent is from 0% to 50% and the water concentration from 0.5% to 95%. The radiopaque agent can be up to 75% of the solids of the coating composition.

2. EXAMPLES

Example 1

To 87 g of water was added a solvent mix of 189 g which consisted of isopropanol and N-methylpyrrolidone, 40 g polyvinylpyrrolidone solution (20% of Kollidone K90, BASF), 40 g aqueous polyurethane dispersion 911 (Alberdinck&Boley), 1.6 g aziridine cross linker NeoCryl CX 100 (Zeneca Resin) and 23 g aqueous colloidal silica solution N 5110 (Eka-Akzo). The polyurethane dispersion 911 is an aliphatic polycarbonate modified polyurethane dispersion. The hydrophilic formulation was mixed and revealed good shelf life.

Coatings with various dilution rates with water showed on a polycarbonate substrate excellent lubricity with contact angles as low as 8 degrees versus 50 degrees for the dry coating and 80 degrees for the uncoated polycarbonate sheet.

Example 2

To 281 g of water was added a solvent mix of 89 g which consisted of isopropanol and diacetone alcohol, 19 g polyvinylpyrrolidone solution (20% of Kollidone K90, BASF), 19 g of aqueous aromatic polyurethane dispersion NeoRez R-940 (NeoResins), 0.8 g aziridine crosslinker NeoCryl CX 100 (Zeneca Resin) and 11 g aqueous colloidal silica solution N5110 (Eka-Akzo). The hydrophilic formulation was mixed and revealed good shelf life.

Coatings with various dilution rates with water showed on a polycarbonate substrate lubricity with contact angles of 24 degrees versus 50 degrees for the dry coating and 80 degrees for the uncoated polycarbonate sheet.

Example 3

To 94 g of water was added a solvent mix of 152 g which consisted of isopropanol and N-methylpyrrolidone, 31.7 g polyvinylpyrrolidone solution (20% of Kollidone K90, BASF), 32.2 g aqueous polyurethane dispersion Sancure 898 (BF Goodrich), 1.3 g aziridine cross linker NeoCryl CX 100 (NeoResins) and 18.4 g aqueous colloidal silica solution N 5110 (Eka-Akzo). The hydrophilic formulation was mixed and revealed good shelf life.

Coatings with various dilution rates with water showed on a polycarbonate substrate excellent lubricity with contact angles as low as 20 degrees versus 47 degrees for the dry coating and 80 degrees for the uncoated polycarbonate sheet.

Example 4

To 173 g of water was added a solvent mix of 115 g which consisted of isopropanol and N-methylpyrrolidone, 23 g polyvinylpyrrolidone solution (20% of Kollidone K90, BASF), 24 g aqueous aliphatic polyurethane dispersion NeoRez R-960 (NeoResins), 0.95 g aziridine cross linker NeoCryl CX 100 (NeoResins) and 13.5 g aqueous colloidal silica solution N 5110 (Eka-Akzo). The hydrophilic formulation was mixed and revealed good shelf life.

Coatings with various dilution rates with water showed on a polycarbonate substrate excellent lubricity with contact angles as low as 18 degrees versus 58 degrees for the dry coating and 80 degrees for the uncoated polycarbonate sheet.

Example 5

To 326 g of water was added a solvent mix of 79 g which consisted of isopropanol and N-methylpyrrolidone, 17 g polyvinylpyrrolidone solution (20% of Kollidone K90, BASF), 17 g aqueous polyurethane dispersion 600 (Alberdinck&Boley), 0.68 g aziridine cross linker NeoCryl CX 100 (NeoResins) and 10 g aqueous colloidal silica solution N 5110 (Eka-Akzo). The polyurethane dispersion 600 is an aliphatic polyether modified polyurethane dispersion. The hydrophilic formulation was mixed and revealed good shelf life.

Coatings with various dilution rates with water showed on a polycarbonate substrate excellent lubricity with contact angles as low as 20 degrees versus 58 degrees for the dry coating and 80 degrees for the uncoated polycarbonate sheet.

Example 6

To 246 g of water was added a solvent mix of 103 g which consisted of isopropanol and N-methylpyrrolidone, 21 g polyvinylpyrrolidone solution (20% of Kollidone K90, BASF), 22 g aqueous polyurethane dispersion 915 (Alberdinck&Boley), 0.87 g aziridine cross linker NeoCryl CX 100 (NeoResins) and 12.6 g aqueous colloidal silica solution N 5110 (Eka-Akzo). The polyurethane dispersion 915 is an aliphatic polyester modified polyurethane dispersion. The hydrophilic formulation was mixed and revealed good shelf life.

Coatings with various dilution rates with water showed on a polycarbonate substrate excellent lubricity with contact angles as low as 14 degrees versus 58 degrees for the dry coating and 80 degrees for the uncoated polycarbonate sheet.

Example 7

To 293 g of water was added a solvent mix of 72 g which consisted of isopropanol and N-methylpyrrolidone, 15 g polyvinylpyrrolidone solution (20% of Kollidone K90, BASF), 15 g aqueous polyurethane dispersion 910 (Alberdinck&Boley), 0.6 g aziridine cross linker NeoCryl CX 100 (NeoResins) and 8.7 g aqueous colloidal silica solution N 5110 (Eka-Akzo). The polyurethane dispersion 910 is an aliphatic polyester modified polyurethane dispersion. The hydrophilic formulation was mixed and revealed good shelf life.

Coatings with various dilution rates with water showed on a polycarbonate substrate excellent lubricity with contact angles as low as 10 degrees versus 47 degrees for the dry coating and 80 degrees for the uncoated polycarbonate sheet.

Example 8 (Comparative Sample)

To 110 g of water was added a solvent mix of 189 g which consisted of isopropanol and N-methylpyrrolidone, 40 g polyvinylpyrrolidone solution (20% of Kollidone K90, BASF), 40 g aqueous polyurethane dispersion 911 (Alberdinck&Boley), 1.6 g aziridine cross linker NeoCryl CX 100 (NeoResins) and no silica. The hydrophilic formulation was mixed and revealed reasonable shelf life.

Coatings with various dilution rates with water showed on a polycarbonate substrate excellent lubricity with contact angles of 16 degrees versus 44 degrees for the dry coating and 80 degrees for the uncoated polycarbonate sheet.

Example 9 (Comparative Sample)

To 292 g of water was added a solvent mix of 89 g which consisted of isopropanol and diacetone alcohol, 19 g polyvinylpyrrolidone solution (20% of Kollidone K90, BASF), 19 g of aqueous polyurethane dispersion NeoRez R-940 (NeoResins), 0.8 g aziridine crosslinker NeoCryl CX100 (NeoResins) and no colloidal silica. The hydrophilic formulation was mixed and revealed good shelf life.

Coatings with various dilution rates with water showed on a polycarbonate substrate lubricity with contact angles of not less than 36 degrees versus 50 degrees for the dry coating and 80 degrees for the dry uncoated polycarbonate sheet.

Example 10 (Comparative Sample)

To 112 g of water was added a solvent mix of 152 g which consisted of isopropanol and N-methylpyrrolidone, 31.7 g polyvinylpyrrolidone solution (20% of Kollidone K90, BASF), 32.2 g aqueous polyurethane dispersion Sancure 898 (BF Goodrich), 1.3 g aziridine cross linker NeoCryl CX 100 (NeoResins) and no colloidal silica. The hydrophilic formulation was mixed and revealed reasonable shelf life.

Coatings with various dilution rates with water showed on a polycarbonate substrate excellent lubricity with contact angles of 30 degrees versus 48 degrees for the dry coating and 80 degrees for the uncoated polycarbonate sheet.

Example 11 (Comparative Sample)

To 190 g of water was added a solvent mix of 112 g which consisted of isopropanol and N-methylpyrrolidone, 23 g polyvinylpyrrolidone solution (20% of Kollidone K90, BASF), 24 g aqueous polyurethane dispersion NeoResin R-960 (NeoResins), 0.95 g aziridine cross linker NeoCryl CX 100 (NeoResins) and no colloidal silica. The hydrophilic formulation was mixed and revealed good shelf life.

Coatings with various dilution rates with water showed on a polycarbonate substrate excellent lubricity with contact angles of 25 degrees versus 46 degrees for the dry coating and 80 degrees for the uncoated polycarbonate sheet.

Example 12 (Comparative Sample)

To 336 g of water was added a solvent mix of 79 g which consisted of isopropanol and N-methylpyrrolidone, 17 g polyvinylpyrrolidone solution (20% of Kollidone K90, BASF), 17 g aqueous polyurethane dispersion 600 (Alberdinck&Boley), 0.68 g aziridine cross linker NeoCryl CX 100 (NeoResins) and no colloidal silica. The hydrophilic formulation was mixed and revealed good shelf life.

Coatings with various dilution rates with water showed on a polycarbonate substrate excellent lubricity with contact angles of 32 degrees versus 40 degrees for the dry coating and 80 degrees for the uncoated polycarbonate sheet.

Example 13 (Comparative Sample)

To 257 g of water was added a solvent mix of 103 g which consisted of isopropanol and N-methylpyrrolidone, 22 g polyvinylpyrrolidone solution (20% of Kollidone K90, BASF), 22 g aqueous polyurethane dispersion 915 (Alberdinck&Boley), 0.87 g aziridine cross linker NeoCryl CX 100 (NeoResins) and no colloidal silica. The hydrophilic formulation was mixed and revealed good shelf life.

Coatings with various dilution rates with water showed on a polycarbonate substrate excellent lubricity with contact angles as low as 22 degrees versus 48 degrees for the dry coating and 80 degrees for the uncoated polycarbonate sheet.

Example 14 (Comparative Sample)

To 302 g of water was added a solvent mix of 72 g which consisted of isopropanol and N-methylpyrrolidone, 15 g polyvinylpyrrolidone solution (20% of Kollidone K90, BASF), 15 g aqueous polyurethane dispersion 910 (Alberdinck&Boley), 0.6 g aziridine cross linker NeoCryl CX 100 (NeoResins) and no colloidal silica. The hydrophilic formulation was mixed and revealed good shelf life.

Coatings with various dilution rates with water showed on a polycarbonate substrate excellent lubricity with contact angles as low as 18 degrees versus 38 degrees for the dry coating and 80 degrees for the uncoated polycarbonate sheet.

Example 15 (Comparative Sample)

To 112 g of water was added a solvent mix of 189 g which consisted of isopropanol and N-methylpyrrolidone, 40 g polyvinylpyrrolidone solution (20% of Kollidone K90, BASF), 40 g aqueous polyurethane dispersion 911 (Alberdinck&Boley), no aziridine cross linker and no colloidal silica. The hydrophilic formulation was mixed and revealed good shelf life.

Coatings with various dilution rates with water showed on a polycarbonate substrate excellent lubricity with contact angles of 18 degrees versus 50 degrees for the dry coating and 80 degrees for the uncoated polycarbonate sheet.

Example 16 (Comparative Sample)

To 293 g of water was added a solvent mix of 89 g which consisted of isopropanol and diacetone alcohol, 19 g polyvinylpyrrolidone solution (20% of Kollidone K90, BASF), 19 g of aqueous polyurethane dispersion NeoRez R-940 (NeoResins), no aziridine crosslinker and no colloidal silica. The hydrophilic formulation was mixed and revealed good shelf life.

Coatings with various dilution rates with water showed on a polycarbonate substrate lubricity with contact angles of not less than 38 degrees versus 55 degrees for the dry coating and 80 degrees for the dry uncoated polycarbonate sheet.

Example 17 (Comparative Sample)

To 112 g of water was added a solvent mix of 152 g which consisted of isopropanol and N-methylpyrrolidone, 31.7 g polyvinylpyrrolidone solution (20% of Kollidone K90, BASF), 32.2 g aqueous polyurethane dispersion Sancure 898 (BF Goodrich), no aziridine cross linker and no colloidal silica. The hydrophilic formulation was mixed and revealed reasonable shelf life.

Coatings with various dilution rates with water showed on a polycarbonate substrate excellent lubricity with contact angles of 35 degrees versus 52 degrees for the dry coating and 80 degrees for the uncoated polycarbonate sheet.

Example 18 (Comparative Sample)

To 191 g of water was added a solvent mix of 112 g which consisted of isopropanol and N-methylpyrrolidone, 23 g polyvinylpyrrolidone solution (20% of Kollidone K90, BASF), 24 g aqueous polyurethane dispersion NeoRez R-960 (NeoResins), no aziridine cross linker and no colloidal silica. The hydrophilic formulation was mixed and revealed good shelf life.

Coatings with various dilution rates with water showed on a polycarbonate substrate excellent lubricity with contact angles of 40 degrees versus 58 degrees for the dry coating and 80 degrees for the uncoated polycarbonate sheet.

Example 19

According to the present invention 3.4 parts of an aqueous aromatic based polyurethane dispersion (component A), 3.2 parts of an aqueous aliphatic polyester modified polyurethane (component B) and 7 parts of a 20% aqueous polyvinylpyrrolidone were combined with 1.5 parts of a colloidal silica, 0.2 parts of crosslinker and 0.3 parts of surfactant in 84.4 parts water-isopropyl alcohol mix. Films resulting from the viscous dispersion were lubricious when wet with a coefficient of friction substantially below 0.05. The coating showed a reduction of friction from 0.28 kg to 0.015 kg, a reduction of 0.265 kg or close to 95%. The composition showed a contact angle below 10 degrees.

Example 20 (Comparative Example from U.S. Pat. No. 4,662,267)

To 47 g of water and 10 g N-methylpyrrolidone was added 10 g of polyvinylpyrrolidone and 33 g of linear polyurethane aqueous dispersion. Films cast from the resulting viscous dispersion were lubricious when wet (coefficient of friction 0.08) and imbibe water forming elastic, transparent films useful as bum and wound dressings. The solution can also be used to spin fibers which are tough and elastic when wet and can be used to produce hydrophilic foams via either mechanical frothing or casting films with added acetone and drying with heat in vacuum. The coefficient of friction of the compositions according to the present invention was far below the recorded value of the referenced example.

Example 21 (Comparative Example)

To a mixture of 75 g diacetone alcohol and 25 g methyl ethyl ketone was added 4 g polyvinylpyrrolidone (Kollidon 90, BASF Corp.) and 2 g linear polyurethane (Estane 5703, B. F. Goodrich Co.). The resulting solution when applied to such substrates as vinyl, epoxy and polyurethane resins and permitted to dry forms a highly durable coating which was slippery when wet (coefficient of friction 0.05). Continuous contact of the coated substrates with water for six months does not degrade the coating or diminish its lubricity to any appreciable extent.

A coefficient of friction of 0.06 was reconfirmed for 1 pull. However, after 10 pulls the coefficient of friction increased to about 0.14, a total change by 0.08.

Example 22

According to the present invention 13 parts of an aqueous aromatic based polyurethane dispersion (component A), 14 parts of an aqueous aliphatic polyester modified polyurethane (component B) and 26 parts of a 20% aqueous polyvinylpyrrolidone were combined with 17 parts of a colloidal silica, 0.5 parts of aziridine crosslinker, 0.6 parts of surfactant in 115 parts water and 128 parts of isopropyl alcohol/NMP mix. The composition when dry becomes very lubricious after wetted and the film is superior in durability.

The coefficient of friction for one pull ws about 0.016. After 10 pulls the coefficient of friction increases only slightly to 0.025, an increase by only 0.009. (See comparative example 21). The coated surfaces was stained evenly with crystal violet solution thus showing good uniformity of the coating. The composition when applied also showed no yellowing in the recycling test, maintained excellent water sheeting capacity without opaqueness, excellent ink absorption, ink adhesion and imaging contrast for printing surfaces according the printing test.

Example 23 (Comparative Sample from U.S. application Ser. No. 20020018898)

A hydrophilic coating was prepared by adding a melamine formaldehyde crosslinking agent (hexamethoxy melamine/formaldehyde, Cymel 303, Cytec Corp.) at 2.0 times the stoichiometric level (relative to eq. wt. acid). The stoichiometric calculations were based upon a functionality of three rather than six for the hexamethoxymelamine, assuming that steric hindrance and lack of availability of reactive acid functionalities for all crosslink functionalities would prevent all six sites from reacting. The coating was cast in a 6 wet mil thick layer on bare aluminum and was cured at 325° F. for 15 minutes.

The comparative sample with a crosslinker requires extreme curing conditions.

Example 24 (Controlled Release)

Stainless steel plates SS 316 of about 1 cm×2.5 cm were primed with an ethylvinylacetate primer solution in NMP/THF containing 2.5% phenolphthalein. After drying the plates were coated with one, two and three coatings of Example 19. The coated sample was repeatedly eluted into 50 g water samples which received 3 drops of a 10% sodium hydroxide solution for color indication of degree of elution. According to the present invention a one topcoat system failed after 15 days (no color). A two topcoat system failed after 60 days (no color) and a three topcoat lasted over 80 days.

Example 25 (Controlled Release, Comparative Sample)

Stainless steel plates SS 316 of about 1 cm×2.5 cm were primed with an ethylvinylacetate primer solution in NMP/THF containing 2.5% phenolphthalein. After drying the plates were coated with one, two and three coatings of Example 20. The coated sample was repeatedly eluted into 50 g of water samples, which received 3 drops of a 10% sodium hydroxide solution for color indication of degree of elution. The comparative sample was completely eluted and failed totally after 15 days (no color).

Example 26

According to the present invention a gel was produced by mixing 15 parts of an aqueous aromatic based polyurethane dispersion, 39 parts of a 20% aqueous polyvinylpyrrolidone solution, 13 parts of a colloidal silica, 0.6 parts of an aziridine crosslinker, 137 parts of an isopropyl alcohol/NMP/diaceton alcohol solvent mix and 146 parts of water.

Example 27

According to the present invention a gel was produced by mixing 13 parts of an aqueous aromatic based polyurethane dispersion, 64 parts of a 20% aqueous polyvinylpyrrolidone solution, 9 parts of a colloidal silica, 0.6 parts of an aziridine crosslinker, 152 parts of an isopropyl alcohol/NMP/diaceton alcohol solvent mix and 90 parts of water.

Example 28

According to the present invention a gel was produced by mixing 8 parts of an aqueous aromatic based polyurethane dispersion, 8 parts of a polyester modified polyurethane dispersion, 42 parts of a 20% aqueous polyvinylpyrrolidone solution, 14 parts of a colloidal silica solution, 0.6 parts of an aziridine crosslinker, 149 parts of an isopropyl alcohol/diaceton alcohol solvent mix and 128 parts of water. Gel examples that were cast on silicone sheets, showed increased lubricity, good antifog properties and can be repeatedly dried and hydrated with or without release additives containing water.

Example 29

According to the present invention 11 parts of an aqueous aromatic based polyurethane dispersion (component A), 11 parts of an aqueous aliphatic polyester modified polyurethane (component B) and 1 part of an aqueous polycarbonate modified polyurethane (component C) and 23 parts of a 20% aqueous polyvinylpyrrolidone were combined with 15 parts of a commercial colloidal silica solution, 0.2 parts of aziridine crosslinker and 5 parts of surfactant in 111 parts of isopropyl alcohol/diacetone alcohol mix and 154 of water. Films resulting from the viscous dispersion are lubricious when wet with a low coefficient of friction, substantial toughness and abrasion resistance. Moist films show contact angles close to 0 degrees. After 25 rubs with isopropyl alcohol soaked gauze, the coating stained with crystal violet or iodine solution on a polycarbonate sheet showed minor abrasion traces.

Example 30 (Comparative Sample from U.S. Pat. No. 4,662,267)

To 47 g of water and 10 g N-methylpyrrolidone was added 10 g of polyvinylpyrrolidone and 33 g of linear polyurethane aqueous dispersion. Films cast from the resulting viscous dispersion were lubricious when wet and were used to produce hydrophilic foams via either mechanical frothing or casting films with added acetone and drying with heat in vacuum.

The coefficient of friction of the compositions according to the present invention was far below the recorded value of the reference example after 25 rubs with isopropyl alcohol soaked gauze, the coating stained with crystal violet on a polycarbonate sheet showed substantial abrasion and failed.

Example 31

According to the present invention 11 parts of an aqueous aromatic based polyurethane dispersion (component A), 11 parts of an aqueous aliphatic polyester modified polyurethane (component B) and 1 part of an aqueous polycarbonate modified polyurethane (component C) and 23 parts of a 20% aqueous polyvinylpyrrolidone were combined with 15 parts of a commercial colloidal silica solution, 2 parts of sodium aluminate, 0.2 parts of aziridine crosslinker and 5 parts of surfactant in 111 parts of isopropyl alcohol/diacetone alcohol mix and 152 of water.

Films resulting from the viscous dispersion were lubricious when wet with a low coefficient of friction, substantial toughness and abrasion resistance. Moist films showed contact angles close to 0 degrees. After 25 rubs with isopropyl alcohol soaked gauze, the coating stained with crystal violet on a polycarbonate sheet showed no abrasion.

Example 32

To 118 g of water was added a solvent mix of 133 g which consisted of isopropanol and N-methylpyrrolidone, 28 g of a 20% aqueous polyvinylpyrrolidone solution, 14 g aqueous aromatic modified polyurethane dispersion, 1 g aqueous polycarbonate modified polyurethane dispersion, 13 g aqueous aliphatic modified polyurethane, 0.5 g aziridine cross linker and 18 g of a commercial colloidal silica solution. The hydrophilic formulation was mixed and revealed good shelf life.

The abrasion test of a coating of the example according to the present invention showed “Good” abrasion resistance on a polycarbonate sheet based on a scale of “Excellent”, “Good”, “Fair” and “Poor”.

Example 33 (Comparative Sample)

To 200 g of water was added a solvent mix of 94 g which consisted of isopropanol and diacetone alcohol, 19 g of a 20% aqueous polyvinylpyrrolidone solution, 20 g aqueous polyester modified polyurethane dispersion, no aziridine cross linker and 13 g of a commercial colloidal silica solution. The hydrophilic formulation was mixed and revealed good shelf life.

The abrasion test of a coating of the example showed “Fair” abrasion resistance on a polycarbonate sheet based on a scale of “Excellent”, “Good”, “Fair” and “Poor”. The contact angle for the dry film was 50 degrees and for a moist film was 18 degrees.

Example 34

To 200 g of water and 4 g of surfactant was added a solvent mix of 94 g which consisted of isopropanol, and diaceton alcohol, 19 g of a 20% aqueous polyvinylpyrrolidone solution, 10 g aqueous aromatic modified polyurethane dispersion, 9 g aqueous polyester modified polyurethane dispersion and 1 g aqueous polycarbonate modified polyurethane dispersion, 0.4 g of an alternative aziridine cross linker and 13 g of a commercial colloidal silica solution. The hydrophilic formulation was mixed and revealed good shelf life.

The abrasion test of a coating of the example according to the present invention showed "Fair" abrasion resistance on a polycarbonate sheet based on a scale of "Excellent", "Good", "Fair" and "Poor". The contact angle for the dry coating was 50 degrees and for the moist coating was 28 degrees.

Example 35

To 143 g of water and 6 g of surfactant was added a solvent mix of 129 g which consisted of isopropanol, diaceton alcohol and N-methylpyrrolidone, 27 g of a 20% aqueous polyvinylpyrrolidone solution, 15 g aqueous aromatic modified polyurethane dispersion and 13 g aqueous aliphatic polyester modified polyurethane dispersion, 0.5 g aziridine cross linker and 17 g of a commercial colloidal silica solution. The hydrophilic formulation was mixed and revealed good shelf life.

The abrasion test of a coating of the example according to the present invention showed "Good" abrasion resistance on a polycarbonate sheet based on a scale of "Excellent", "Good", "Fair" and "Poor". The contact angle for the dry coating was 35 degrees and for the moist coating was near 0 degrees.

Example 36

To 118 g of water and 6 g of surfactant was added a solvent mix of 133 g which consisted of isopropanol, diaceton alcohol and N-methylpyrrolidone, 28 g of a 20% aqueous polyvinylpyrrolidone solution, 14 g aqueous aromatic modified polyurethane dispersion and 13 g aqueous aliphatic polyester modified polyurethane dispersion, 1 g aqueous polycarbonate modified polyurethane dispersion, 0.5 g aziridine cross linker and 18 g of a commercial colloidal silica solution. The hydrophilic formulation was mixed and revealed good shelf life.

The abrasion test of a coating of the example according to the present invention showed "Good" abrasion resistance on a polycarbonate sheet based on a scale of "Excellent", "Good", "Fair" and "Poor". The contact angle for the dry coating was 45 degrees and for the moist coating was 21 degrees.

Example 37

To 200 g of water and 4 g of surfactant was added a solvent mix of 94 g which consisted of isopropanol, and diaceton alcohol, 19 g of a 20% aqueous polyvinylpyrrolidone solution, 9 g aqueous polyester modified polyurethane dispersion and 11 g aqueous polycarbonate modified polyurethane dispersion, 0.3 g aziridine cross linker and 13 g of a commercial colloidal silica solution. The hydrophilic formulation was mixed and revealed good shelf life.

The abrasion test of a coating of the example according to the present invention showed "Good" abrasion resistance on a polycarbonate sheet based on a scale of "Excellent", "Good", "Fair" and "Poor". The contact angle for the dry coating was 30 degrees and for the moist coating was 27 degrees.

Example 38

To 200 g of water and 4 g of surfactant was added a solvent mix of 94 g which consisted of isopropanol, diaceton alcohol and N-methylpyrrolidone, 19 g of a 20% aqueous polyvinylpyrrolidone solution, 10 g aqueous aromatic modified polyurethane dispersion and 9 g aqueous aliphatic polyester modified polyurethane dispersion, 1 g aqueous polycarbonate modified polyurethane dispersion, 0.4 g aziridine cross linker and 13 g of a commercial colloidal silica solution. The hydrophilic formulation was mixed and revealed good shelf life.

The abrasion test of a coating of the example according to the present invention showed "Excellent" abrasion resistance on a polycarbonate sheet based on a scale of "Excellent", "Good", "Fair" and "Poor". The contact angle for the dry coating was 48 degrees and for the moist coating was 16 degrees.

Example 39

To 200 g of water and 4 g of surfactant was added a solvent mix of 94 g which consisted of isopropanol, diaceton alcohol and N-methylpyrrolidone, 19 g of a 20% aqueous polyvinylpyrrolidone solution, 10 g aqueous aromatic modified polyurethane dispersion, 9 g aqueous aliphatic polyester modified polyurethane dispersion, 1 g aqueous polycarbonate modified polyurethane dispersion, 0.4 g aziridine cross linker and 13 g of an alternative commercial colloidal silica solution. The hydrophilic formulation was mixed and revealed good shelf life. The contact angle for the dry coating was 27 degrees and for the moist coating was 14 degrees.

Example 40 (Comparative Sample)

To 200 g of water was added a solvent mix of 94 g which consisted of isopropanol and diacetone alcohol, 19 g of a 20% aqueous polyvinylpyrrolidone solution, 10 g aqueous aromatic modified polyurethane dispersion, 9 g aqueous aliphatic polyester modified polyurethane dispersion, 1 g aqueous polycarbonate modified polyurethane dispersion, no aziridine cross linker and 13 g of an alternative commercial colloidal silica solution. The hydrophilic formulation was mixed and revealed good shelf life.

The abrasion test of a coating of the example showed "Fair" abrasion resistance on a polycarbonate sheet based on a scale of "Excellent", "Good", "Fair" and "Poor". The contact angle for a dry film was 50 degrees and for a moist film was 34 degrees.

Example 41

To 200 g of water was added a solvent mix of 94 g which consisted of isopropanol and diacetone alcohol, 19 g of a 20% aqueous polyvinylpyrrolidone solution, 10 g aqueous aromatic modified polyurethane dispersion, 9 g aqueous aliphatic polyester modified polyurethane dispersion, 1 g aqueous polycarbonate modified polyurethane dispersion, 0.4 g melamine cross linker and 13 g of an alternative commercial colloidal silica solution. The hydrophilic formulation was mixed and revealed good shelf life.

The abrasion test of a coating of the example showed "Good" abrasion resistance on a polycarbonate sheet based on a scale of "Excellent", "Good", "Fair" and "Poor". The contact angle for a dry film was 64 degrees and for a moist film was 22 degrees.

Example 42

Example 27 according to the present invention was used for a repeated dip coating process of a mandrel to manufacture a polyurethane tubing with and without enforcing fiber sleeves. The tubing was hydrophilic, became lubricious and swelled upon contact with water, absorbing water with and without water dissolved additives.

Example 43

Example 27 according to the present invention was cast on a silicone foil forming a gel type opaque sheet of a thickness of about 2 mm. Samples were dried in a controlled humidity chamber at 20% RH. Dry samples measured 2 cm×2 cm and were transparent. When hydrated in water the sheet sample swelled to over twice the area of the dry sample.

The sheet was hydrophilic, became lubricious and swelled upon contact with water and absorbed water with and without water dissolved additives.

Example 44

The weight of samples from the dried sheets of Example 27 according to the present invention was determined before and after storage in water. The original sample of 3 cm×1 cm had a weight of 0.18 g. After 30 min the weight increased to 0.8 g or over 4 times its original weight. After 1 hr the weight reached 6 times its original weight, after 24 hrs the weight reached 10.3 times its original weight.

Example 45

Samples from the dried sheets of Example 27 according to the present invention were soaked for 30 min in various sodium chloride solutions as electrolytes. A pure 2 cm×1 cm sample showed a resistance of about 4000 Ohm between two stainless steel plates. Samples with 0.5% NaCl had 1500 Ohm, 1% has 1500 Ohm and 2% had 1100 Ohm.

Example 46 (Comparative Anti-Fog from U.S. Pat. No. 4,467,073)

Polyvinylpyrrolidone, PVP-K90, 2.5 g, was dissolved in 100 ml of a mixture of 75% diacetone alcohol and 25% cyclohexane, followed by 1.0 g dioctyl sodium sulfosuccinate surfactant and 5.0 g Tycel 7351 isocyanate prepolymer (Hughson Chemicals, Lord Corporation). Coatings applied with this composition and cured 24 hours at 72° F. were transparent, colorless, hard and scratch resistant and did not fog when cooled to 32° F. and then held over a beaker of boiling water. Fog resistance was not diminished after 20 cycles of cooling, exposing to steam and drying. The fog resistance was essentially intact after 3 days soaking in water. The coating exhibited excellent adhesion to polycarbonate, polyester, polymethylmethacrylate and cellulose acetate plastics.

Example 47

A coating formulation as mentioned in Example 19 according to the present invention was used to coat polycarbonate and tested for its anti-fog properties. The film was cured at 120° C. for 3 min. The coating is transparent, highly scratch resistant, and withstands continuous water-spraying for at least 168 hrs without loosing its water-sheeting properties. 30% addition of shredded samples of anti-fog coated polycarbonate to virgin polycarbonate withstands the recycling conditions without yellowing. The comparative sample according to Example 46 lost its hydrophilic property completely after the mentioned spary time and showed significant yellowing after the curing and re-extrusion conditions mentioned in this example.

Example 48 (Comparative Sample from U.S. Pat. No. 4,789,720)

Coated Cathether: A latex Foley urinary catheter was dip-coated with a solution made from 3 parts of polymer from Example 1 and 97 parts of dichloroethane. After air drying, the dipping was repeated. The coating was cured at 80° C. for 5 minutes. While the uncoated latex had a coefficient of friction of 0.4, the coated catheter had a coefficient of friction in fully hydrated state of 0.18.

Example 49

A latex Foley urinary catheter was dip-coated with the composition of Example 19 according to the present invention. The coating was done in a one-step process and air dried without additional curing. The coefficient of friction was substantially below 0.05.

Example 50

The catheter coating composition of Example 19 was modified with 25% commercially available antimicrobial colloidal silver (Milliken). Adhesion and lubricity of the one-step coated catheters were not compromised.

Example 51

Strips of 2.5 cm×5 cm made according to composition in Example 27 from a film were dried and subsequently soaked for 30 min. in fish-oil emulsion known as fish bait (Dr. Juice). Such dry samples function well over extended period time as effective fish bait on fishing hooks.

Example 52

Sheet samples according to composition in Example 27 and variations about 2 cm wide and 10 cm long were tested regarding elongation capacity and elasticity. A sample without colloidal silica and crosslinker reached an elongation of 2.5 cm before breaking. The breaking force was 0.15 lbs. A similar sample which contained colloidal silica but no crosslinker reached elongation of 5 cm with a breaking force of 0.2 lbs. A sample according to the present invention also reached an elongation of 5 cm but the force needed to break the sample was 0.9 lbs.

Thus, while there has been disclosed what is presently believed to be preferred embodiments of the invention, those skilled in the art will appreciate that other and further changes and modifications can be made without departing from the scope or spirit of the invention.

We claim:

1. An aqueous coating composition for providing the surface of an object with a durable hydrophilic coating comprising:

a) a multifunctional modified polyurethane carrier dispersed or emulsified in water, in a concentration from about 0.5 to about 15 wt %, based on the total weight of the coating composition, wherein said carrier forms a polymeric matrix upon drying or curing said coating composition;

b) a hydrophilic water-soluble organic monomer, oligomer, prepolymer, polymer or copolymer derived from N-vinylpyrrolidone, in a concentration from about 0.001 to about 10 wt %, based on the total weight of the coating composition;

c) a multifunctional aqueous colloidal metal oxide, in a concentration from about 0.01 to about 25 wt %, based on the total weight of the coating composition; and d) a multifunctional crosslinker;

wherein a coating of said composition is a durable hydrophilic coating upon drying or curing said coating.

2. The coating composition according to claim 1, wherein the multifunctional aqueous colloidal metal oxide is derived from a metal selected from the group consisting of aluminum, silicon, titanium, zirconium, zinc, tin, silver and combinations thereof.

3. The coating composition according to claim 2, wherein said multifunctional aqueous colloidal metal oxide is a combination of colloidal alumina and silica having a ratio of about 1:10.

4. The coating composition according to claim 1, wherein the colloidal metal oxide is selected from the group consisting of an aluminate, silicate, titanate, zincate, stannate, argentite, aluminum silicate, aluminum titanate, zirconate, zircoaluminate and a combination thereof.

5. The coating composition according to claim 1, wherein the multifunctional crosslinker is a multifunctional compound of a type selected from the group consisting of aziridine, carbodiimide, oxirane, alcohol, glycydyl ether, glycidyl ester, carboxyl acid, amine, epoxide, vinyl sulfone, amide, allyl, prepolymeric resins of said multifunctional compounds and combinations thereof.

6. The coating composition according to claim 5, wherein the multifunctional aziridine is selected from the group consisting of trimethylolpropane tri-[.beta.-(N-aziridinyl)-propionate]; 2,2-bishydroxymethyl butanoltris[3-(1-aziridine) propionate]; aziridine-2-methylol acrylate; aziridine-2-methylol methacrylate; N-(2-aziridinyl) methylacrylamide; N-(2-aziridinyl)-methylmethacrylamide; 1-(aziridin-2-yl)-2-oxabut-3-ene; 4-(aziridin-2-yl)-but-1-ene; 5-(aziridin-2-yl)-pent-1-ene; prepolymeric resins of said aziridine compounds; and combinations thereof.

7. The coating composition according to claim 5, wherein the multifunctional carbodiimide is selected from the group consisting of a carbodiimide, prepolymeric resins of said multifunctional carbodiimides and combinations thereof.

8. The coating composition according to claim 5, wherein the multifunctional alcohol is selected from the group consisting of glycerin; pentaerythritol; pentaerythritol ethoxylate; pentaerythritol propoxylate; ethylene glycol; diethylene glycol; triethylene glycol; tetraethylene glycol; polyethylene glycol; 1,2,3-propanetriol; polyglycerol; propylene glycol; 1,2-propanediol; 1,3-propanediol; trimethylol propane; diethanolamine; triethanolamine; polyoxypropylene-oxyethylene-oxypropyle block copolymer; sorbitan fatty acid esters, polyoxyethylene sorbitan fatty acid esters; sorbitol; a polyglycidyl ether compound; and combinations thereof.

9. The coating composition according to claim 8, wherein said polyglycidyl ether compound is selected from the group consisting of ethylene glycol diglycidyl ether, polyethylene glycol diglycidyl ether, glycerol polyglycidyl ether, diglycerol polyglycidyl ether, polyglycerol polyglycidyl ether, sorbitol polyglycidyl ether, pentaerythritol polyglycidyl ether, propylene glycol diglycidyl ether, propylene glycol diglycidyl ether and a combination thereof.

10. The coating composition according to claim 5, wherein the multifuncional amine is selected from the group consisting of a melamine, hexamethylendiamine, hexamethylentetramine and guanidine.

11. The coating composition according to claim 1, further comprising an auxiliary agent for performance enhancement of the aqueous coating composition and/or the resulting hydrophilic coating of the said coated surface.

12. The coating composition according to claim 11, wherein the auxiliary agent is selected from the group consisting of a surfactant, a wetting agent, an emulsifier, a dye, pigment, colorant, UV absorber, radical scavenger, anti-oxidant, anti-corrosion agent, optical brightener, fluorescers, bleaches, bleach activators, bleach catalysts, non-activated enzymes, enzyme stabilizing systems, chelants, coating aid, metal catalyst, metal oxide catalyst, organometallic catalyst, filmforming promoter, hardener, linking accelerator, flow agent, leveling agent, defoaming agent, lubricant, matte particle, rheological modifier, thickener, conductive or non-conductive metal oxide particle, magnetic particle, anti-static agent, pH control agents, perfumes, biocide, pesticide, anti-fouling agent, antimicrobial agent, aligicide, bactericide, germicides, disinfectant, fungicide, bio-effecting agent, vitamin, drug, therapeutic agent and a combination thereof.

13. The coating composition according to claim 12, wherein said biocide is selected from the group consisting of parabens, formaldehyde releasers, haloalkyls, haloalkynyls, alkyl acids, aryl acids, isothiazolinons, quats, zinc oxide, zinc organics, iodine, povidone-iodine, chlorhexidine, bronopol, triclosan, clotrimazol, propiconazole, tebuconazole, miconazole, tolnaphtate, clioquinol, colloidal silver, silver complexes, silver salts and combinations thereof.

14. The coating composition according to claim 12, wherein said antimicrobial agent is selected from the group consisting of antibiotics, antiseptics, disinfectants, tetracyclines, rifamycins, rapamycin, macrolides, penicilins, cephalosporins, beta-lactam antibiotics, aminoglycosides, chloramphenicol, sufonamides, glycopeptides, quinolones, ciprofloxacin, fusidic acid, trimethoprim, metronidazole, clindamycin, mupirocin, polyenes, azotes, fluconazole and beta-lactam inhibitors.

15. A coating composition according to claim 12, wherein said therapeutic agent is selected from the group consisting of analgesics, anti-inflammatory agents, topical antipuritics, anti-itch agents, steroids, dermatological agents, anthralin coal tar extracts, keratolytic agents, local anaesthetic agents, anti-acne agents, vitamin A and wart removing agents.

16. A coating composition according to claim 12, wherein said drug is selected from the group consisting of taxol, paclitaxel, dexamethasone, heparin, tacrolimus, everolimus, cyclosporins, sirolimus, aspirin, hirudin, a nitric oxide releasing drug, angiopeptin, enoxaprin, pyrolytic carbon, silicon carbide, and combinations thereof.

17. The coating composition according to claim 11, wherein the auxiliary agent includes a radiopaque agent.

18. The coating composition according to claim 17, wherein the radiopaque agent is up to 75% by weight of the solids of the coating composition.

19. A coating composition according to claim 17, wherein said radiopaque agent is selected from the group consisting of diatrizoate, iothalamate, metrizoate, iodipamide, triiodobenzoic acid, iothalamic acid, iopanoic or iodopanoic acid, triiodophenyl acid, iodothalamic acid, iodine, iodides, bromine, perfluorooctyl bromide, barium sulfate, samarium, erbium, bismuth trioxide, titanium oxide, zirconium oxide, gold, platinum, silver, tantalum, niobium, tungsten, gold, titanium, iridium, platinum, rhenium and combinations thereof.

20. The coating composition according to claim 11, wherein the concentration of the auxiliary agent is from about 0.001% to about 10% by weight.

21. The coating composition according to claim 20, wherein the concentration of the auxiliary agent is from about 0.01% to about 5% by weight.

22. The coating composition according to claim 11, wherein the auxiliary agent includes at least one solvent selected from the group consisting of alcohols, alkylketones, arylalkylketones, ketoalcohols, cyclic ketones, heterocyclic ketones, ethers, cyclic ethers, esters, and combinations thereof.

23. The coating composition according to claim 11, wherein the auxiliary agent is chemically bonded and/or physically incorporated into the aqueous coating composition or incorporated into the finished hydrophilic coating on the surface of the object.

24. The coating composition according to claim 1, wherein said coating composition is in the form of a gel.

25. The coating composition according to claim 24, wherein said gel is used for topical transdermal application as a medical gel for wound dressing in human or animal application.

26. The coating composition according to claim 1, wherein the hydrophilic water-soluble organic monomer, oligomer, prepolymer, polymer or copolymer concentration is from about 0.25% to about 10% by weight.

27. The coating composition according to claim 1, wherein the multifunctional aqueous colloidal metal oxide concentration is from about 0.25% to about 20% by weight.

28. The coating composition according to claim 1, wherein the cross linker concentration is from about 0.001 to about 8% by weight.

29. The coating composition according to claim 28, wherein the cross linker concentration is from about 0.01% to about 3% by weight.

30. The coating composition according to claim 1, further comprising at least one organic solvent in an amount from 0.5% to 50% and water in an amount from 1% to 95% by weight.

31. The coating composition according to claim 1, wherein the surface of the object consists of a metal, metal alloy, plastic, glass, human skin or animal skin.

32. The coating composition according to claim 1, wherein said hydrophilic coating, formed by coating said surface with said coating composition and drying or curing said composition, exhibits improved water wetting ability after rewetting said dried or cured coating.

33. The coating composition according to claim 32, wherein said coating exhibits a reduction in contact angle after being wetted with water compared to the dry coating.

34. The coating composition according to claim 32, wherein said hydrophilic coating, formed by coating said surface with said coating composition and drying or curing said composition, exhibits a reduction in friction compared to the uncoated surface when each are wetted with water.

35. The coating composition according to claim 34, wherein said reduction is about 95%.

36. The coating composition according to claim 34, wherein said hydrophilic coating retains its lubricity after repeated moistening and drying cycles.

37. The coating composition according to claim 1, wherein said colloidal metal oxide is present in an amount sufficient to provide a coating having-improved lubricity when wetted compared to a similar coating without said colloidal metal oxide.

38. The coating composition according to claim 1, wherein said colloidal metal oxide is present in an amount sufficient to provide a coating having inreased-aqueous solution uptake compared to a similar coating without said colloidal metal oxide.

39. The coating composition according to claim 38, wherein said aqueous solution uptake is increased by about 100 wt %.

40. A medical device for introduction into a human or animal body, comprising a hydrophilic coating on at least one surface of said device, said hydrophilic coating formed from-an aqueous coating composition-comprising:

a) a multifunctional polymeric carrier dispersed or emulsified in water, in a concentration from about 0.5 to about 15 wt %, based on the total weight of the coating composition, wherein said carrier forms a polymeric matrix upon drying or curing said coating composition;

b) a hydrophilic water-soluble organic monomer, oligomer, prepolymer, polymer or copolymer, in a concentration from about 0.001 to about 25 wt %, based on the total weight of the coating composition;

c) a multifunctional aqueous colloidal metal oxide, in a concentration from about 0.01 to about 25 wt %, based on the total weight of the coating composition; and d) a multifunctional crosslinker;

wherein a coating of said composition is a durable hydrophilic coating upon drying or curing said coating.

41. The coating composition according to claim 40, wherein the dispersed or emulsified multifunctional polymeric carrier is selected from the group consisting of a modified polymeric urethane, urea, ester, ether, carbonate, vinyl, acrylic, methacrylic, alkyd, acrylamide, maleic anhydride, an epoxy prepolymer and combinations thereof.

42. The coating composition according to claim 40, wherein the hydrophilic organic monomer, oligomer, prepolymer or copolymer is derived from vinyl alcohol, N-vinylpyrrolidone, N-vinyl lactam, acrylamide, amide, styrenesulfonic acid, combination of vinylbutyral and N-vinylpyrrolidone, hydroxyethyl methacrylate, acrylic acid, vinylmethyl ether, vinylpyridylium halide, melamine, maleic anhydride/methyl vinyl ether, vinylpyridine, ethyleneoxide, ethyleneoxide ethylene imine, glycol, vinyl acetate, vinyl acetate/crotonic acid, methyl cellulose; ethyl cellulose, carboxymethyl cellulose, hydroxyethyl cellulose, hydroxypropyl cellulose, hydroxymethyl ethyl cellulose, hydroxypropylmethyl cellulose, cellulose acetate, cellulose nitrate, starch, gelatin, albumin, casein, gum, alginate, hydroxyethyl (meth)acrylate, hydroxypropyl (meth)acrylate, ethylene glycol (meth)acrylates, N-alkyl (meth) acrylamides, N,N-dialkyl (meth)acrylamides, N-hydroxyalkyl (meth)acrylamide polymers, N,N-dihydroxyalkyl (meth) acrylamide polymers, ether polyols, polyethylene oxide, polypropyleneoxide,poly(vinyl ether), alkylvinyl sulfones, alkylvinylsulfone-acrylates or a combination thereof.

43. The medical device according to claim 40, wherein the device is at least partially made of a metal or metal alloy selected from the group consisting of stainless steel, nickel, nickel-cobalt, titanium, NiTi, tantalum, nitinol, rare earth metal, silver, gold, platinum; tungsten, combinations thereof and alloys or plated articles thereof.

44. The medical device according to claim 40, wherein the device is at least partially made of a plastic material selected from the group consisting of polyurethane, polycarbonate, polyethers, polyesters, polyvinyl chloride, polystyrene, polyethylene, polyvinyl acetate, silicone rubbers, rubber latex, polyester-polyether copolymers, ethylene methacrylates, polymeric phthalates, silicone, natural and synthetic rubbers, nylon, polyamide, fluorinated plastic materials and combinations thereof.

45. The medical device according to claim 40, wherein the device is at least partially made of glass.

46. The medical device according to claim 45, wherein said glass is selected from the group consisting of optical glasses, optical lenses, polarizing glasses, mirrors, optical mirrors, prisms and quartz glass.

47. The medical device according to claim 40, wherein said hydrophilic coating is formed by applying said aqueous coating composition to the surface of said device by dipping, brushing, flooding, spraying, electrolytic depositing, electrostatic spraying, electroplating, vacuum treatment, pressure treatment or combinations thereof.

48. The medical device according to claim 40, wherein said device is in the form of a tube, capillary, wire, sheet, coil, rod, lattice or network of wires.

49. The medical device according to claim 40, wherein the device is a surgical rod, a guidewire, a guidewire tube, a coiled guiding tube, a catheter, a coiled catheter, an expendable or non-expendable stent, an electrodal coil, a needle, a blade, a metallic medical device, a tablet, a capsule, a fiber, a wound dressing, a suture thread, a balloon, a foil, a guiding tube, an ocular lens delivery device, or a wound drain.

50. The medical device according to claim 40, wherein said hydrophilic coating is non-toxic and non-deleterious to living tissue.

51. The medical device according to claim 40, wherein said hydrophilic coating is directly coated on said at least one surface of said device.

52. The medical device according to claim 40, wherein said at least one surface of said device is coated with a primer and said hydrophilic. coating is directly coated on said primer.

53. The medical device according to claim 40, wherein said coated surface exhibits a reduction in friction compared to the uncoated surface when each are wetted with water.

54. The medical device according to claim 53, wherein said coated surface retains its lubricity after repeated moistening and drying cycles.

55. The medical device according to claim 53, wherein said coated surface has a reduction in friction of about 95% when wet compared to the uncoated surface.

56. The-medical device according to claim 40, wherein said multifunctional polymeric carrier is a modified polymeric polyurethane and said hydrophilic water-soluble organic monomer, oligomer, prepolymer, polymer or copolymer is derived from N-vinylpyrrolidone.

57. The medical device according to claim 56, wherein said colloidal metal oxide is selected from the group consisting of an aluminate, silicate, titanate, zincate, stannate, argentite, aluminums silicate, aluminum titanate, zirconate, zircoaluminate and a combination thereof.

58. The medical device according to claim 40, wherein the multifunctional crosslinker is a multifunctional compound of a type selected from the group consisting of aziridine, carbodiimide, oxirane, alcohol, glycydyl ether, glycidyl ester, carboxyl acid, amine, epoxide, vinyl sulfone, amide, allyl, prepolymeric resins of said multifunctional compounds and combinations thereof.

59. The medical device according to claim 40, wherein the coating composition further comprises an auxiliary agent selected from the group consisting of a surfactant, a wetting agent, an emulsifier, a dye, pigment, colorant, UV absorber, radical scavenger, anti-oxidant, anti-corrosion agent, optical brightener, fluorescers, bleaches, bleach activators, bleach catalysts, non-activated enzymes, enzyme stabilizing systems, chelants, coating aid, metal catalyst, metal oxide catalyst, organometallic catalyst, filmforming promoter, hardener, linking accelerator, flow agent, leveling agent, defoaming agent, lubricant, matte particle, rheological modifier, thickener, conductive or non-conductive metal oxide particle, magnetic particle, anti-static agent, pH control agents, perfumes, biocide, pesticide, anti-fouling agent antimicrobial agent, aligicide, bactericide, germicides, disinfectant, fungicide, bio-effecting agent, vitamin, drug, therapeutic agent and a combination thereof.

60. The medical device according to claim 40, wherein the hydrophilic water-soluble organic monomer, oligomer, prepolymer, polymer or copolymer concentration is from about 0.25% to about 10% by weight.

61. The medical device according to claim 40, wherein the multifunctional aqueous colloidal metal oxide concentration is from about 0.25% to about 20% by weight.

62. An aqueous coating composition for providing the surface of an object with a durable antifog coating comprising:

a) a multifunctional modified polyurethane carrier dispersed or emulsified in water, in a concentration from about 0.5 to about 15 wt %, based on the total weight of the coating composition, wherein said carrier forms a polymeric matrix upon drying or curing said coating composition;

b) a hydrophilic water-soluble organic monomer, oligomer, prepolymer, polymer or copolymer derived from N-vinylpyrrolidone, in a concentration from about 0.001 to about 10 wt %, based on the total weight of the coating composition;

c) a multifunctional aqueous colloidal metal oxide, in a concentration from about 0.01 to about 25 wt %, based on the total weight of the coating composition; and d) a multifunctional crosslinker;

wherein a coating of said composition is a durable antifog coating upon drying or curing said coating.

63. The coating composition according to claim 62, wherein the multifunctional aqueous colloidal metal oxide is derived from a metal selected from the group consisting of aluminum, silicon, titanium, zirconium, zinc, tin, silver and a combination thereof.

64. The coating composition according to claim 63, wherein said multifunctional aqueous colloidal metal oxide is a combination of colloidal alumina and silica having a ratio of about 1:10.

65. The coating composition according to claim 62, wherein the colloidal metal oxide is selected from the group consisting of an aluminate, silicate, titanate, zincate, stannate, argentite, aluminum silicate, aluminum titanate, zirconate zircoaluminate, and a combination thereof.

66. The coating composition according to claim 62, wherein the multifunctional crosslinker is a multifunctional compound of a type selected from the group consisting of aziridine, carbodiimide, oxirane, alcohol, glycydyl ether, glycidyl ester, carboxyl, amine, epoxide, vinyl sulfone, amide, allyl, prepolymeric resins of said multifunctional compounds and combinations thereof.

67. The coating composition according to claim 66, wherein the multifunctional aziridine compound is selected from the group consisting of trimethylolpropane tri-[.beta.-(N-aziridinyl)-propionate]; 2,2-bishydroxymethyl butanol-tris[3-(1-aziridine) propionate]; aziridine-2-methylol acrylate; aziridine-2-methylol methacrylate; N-(2-aziridinyl) methylacrylamide; N-(2-aziridinyl)-methylmethacrylamide; 1-(aziridin-2-yl)-2-oxabut-3-ene; 4-(aziridin-2-yl)-but-1- ene; 5-(aziridin-2-yl)-pent-1-ene; prepolymeric resins of said aziridine compounds; and combinations thereof.

68. The coating composition according to claim 66, wherein the multifunctional carbodiimide is selected from the group consisting of a carbodiimide, prepolymeric resins of said multifunctional carbodiimides and combinations thereof.

69. The coating composition according to claim 66, wherein the multifunctional alcohol is selected from the group consisting of glycerin, pentaerythritol, ethylene glycol, diethylene glycol, triethylene glycol, tetraethylene glycol, polyethylene glycol; 1,2,3-propanetriol, polyglycerol, propylene glycol, 1,2-propanediol, 1,3-propanediol, trimethylol propane, diethanolamine, triethanolamine, polyoxypropylene oxyethylene-oxypropyle block copolymer, sorbitan fatty acid esters, polyoxyethylene sorbitan fatty acid esters, pentaerythritol derivatives, sorbitol, a polyglycidyl ether compound and combinations thereof.

70. The coating composition according to claim 69, wherein said polyglycidyl ether compound is selected from the group consisting of ethylene glycol diglycidyl ether, polyethylene glycol diglycidyl ether, glycerol polyglycidyl ether, diglycerol polyglycidyl ether, polyglycerol polyglycidyl ether, sorbitol polyglycidyl ether, pentaerythritol polyglycidyl ether, propylene glycol diglycidyl ether, and propylene glycol diglycidyl ether and a combination thereof.

71. The coating composition according to claim 66, wherein said multifunctional amine is selected from the group consisting of a melamine, hexamethylendiamine, hexamethylentetramine, and guanidine.

72. The coating composition according to claim 62, further comprising at least one auxiliary agent for performance enhancement of the aqueous coating composition and/or the resulting hydrophilic coating of said coated surface.

73. The coating composition according to claim 72, wherein the auxiliary agent is selected from the group consisting of a surfactant, a wetting agent, an:emulsifier, a dye, pigment, colorant, UV absorber, radical scavenger, anti-oxidant, anti-corrosion agent, optical brightener, fluorescers, bleaches, bleach activators, bleach catalysts, non-activated enzymes, enzyme stabilizing systems, chelants, coating aid, flow agent, leveling agent, defoaming agent, lubricant, matte particle, rheological modifier, thickener, conductive or non-conductive metal oxide particle, magnetic particle, anti-static agent, pH control agents; perfumes, biocide, pesticide, anti-fouling agent, algicide, antimicrobial agent, bactericide, germicides, disinfectant, fungicide, bio-effecting agent, vitamin and a combination thereof.

74. The coating composition according to claim 72, wherein said auxiliary agent includes a radiopaque agent.

75. The coating composition according to claim 74, wherein the radiopaque agent is up to 75% of the solids of the coating composition.

76. The coating composition according to claim 74, wherein said radiopaque agent is selected from the group consisting of diatrizoate, iothalamate, metrizoate, iodipamide, triiodobenzoic acid, iothalamic acid, iopanoic acid, triiodophenyl acid, iodothalamic acid, iodine, iodides, bromine, perfluorooctyl bromide, barium sulfate samarium, erbium, bismuth trioxide, titanium oxide, zirconium oxide, gold, platinum, silver, tantalum, niobium, tungsten, gold, titanium, iridium, platinum, rhenium and combinations thereof.

77. A metal, plastic or glass object having enhanced x-ray and radar visibility combined with anti-fog and lubricious properties, comprising a hydrophilic coating on at least one surface of said objected, said hydrophilic coating formed from the aqueous coating composition of claim 76.

78. The object according to claim 77, wherein the object is selected from the group consisting of passenger balloons, weather balloons, small airplanes, RF-shields, small boats, lifebuoys, lifeboats and life rafts.

79. The coating composition according to claim 72, wherein the concentration of the auxiliary agent is from about 0.001% to about 10% by weight.

80. The coating composition according to claim 79, wherein the concentration of the auxiliary agent from about 0.01% to about 5% by weight.

81. The coating composition according to claim 62, wherein the hydrophilic water-soluble organic monomer, oligomer, prepolymer, polymer or copolymer concentration is from about 0.25% to about 10% by weight.

82. The coating composition according to claim 62, wherein the multifunctional aqueous colloidal metal oxide concentration is from about 0.25% to about 20% by weight.

83. The coating composition according to claim 62, wherein the cross linker concentration is from about 0.001 to about 8% by weight.

84. The coating composition according to claim 83, wherein the cross linker, concentration is from about 0.01% to about 3% by weight.

85. The coating composition according to claim 62, wherein the composition further comprises an organic solvent in an amount from 0.5% to 50% and water in an amount from 1% to 95% by weight.

86. The coating composition according to claim 85, wherein said organic solvent is selected from the group consisting of alcohols, alkylketones, arylalkylketones, ketoalcohols, cyclic ketones, heterocyclic ketones, ethers, cyclic ethers, esters and combinations thereof.

87. The coating composition according to claim 62, wherein said antifog coating, formed by coating said surface with said coating composition and drying or curing said composition, exhibits improved water wetting ability after rewetting said coating.

88. The coating composition according to claim 87, wherein said coating exhibits a reduction in contact angle after being wetted with water compared to the dry coating.

89. The coating composition according to claim 62, wherein said antifog coating, formed by coating said surface with said coating composition and drying or curing said composition, exhibits a reduction in friction compared to the uncoated surface when each are wetted with water.

90. The coating composition according to claim 89, wherein said reduction is about 95%.

91. The coating composition according to claim 89, wherein said antifog coating retains its lubricity after repeated moistening and drying cycles.

92. The coating composition according to claim 62, wherein said colloidal metal oxide is present in an amount sufficient to provide a coating having improved lubricity when wetted compared to a similar coating without said colloidal metal oxide.

93. The coating composition according to claim 62, wherein said colloidal metal oxide is present in an amount sufficient to provide a coating having inreased-aqueous solution uptake compared to a similar coating without said colloidal metal oxide.

94. The coating composition according to claim 93, wherein said-aqueous solution uptake is increased by about 100 wt %.

95. An object having anti-fog properties, comprising an object having a hydrophilic coating on at least one surface of said object which has antifog properties, said hydrophilic coating formed from an aqueous coating composition comprising:

a) a multifunctional modified polyurethane carrier dispersed or emulsified in water, in a concentration from about 0.5 to about 15 wt %, based on the total weight of the coating composition, wherein said carrier forms a polymeric matrix upon drying or curing said coating composition;

a hydrophilic water-soluble organic monomer, oligomer, prepolymer, polymer or copolymer derived from N-vinylpyrrolidone, in a concentration from about 0.001 to about 10 wt %, based on the total weight of the coating composition;

c) a multifunctional aqueous colloidal metal oxide, in a concentration from about 0.01 to about 25 wt %, based on the total weight of the coating composition; and d) a multifunctional crosslinker;

wherein a coating of said composition is a durable antifog coating upon drying or curing said coating.

96. The object according to claim 95, wherein the surface of said object consists of a metal, metal alloy, plastic or glass or a combination thereof, prior to coating with said coating composition, and has anti-fog properties, upon coating with said coating composition.

97. The object according to claim 96, wherein said surface is lubricious, upon coating with said coating composition.

98. The object according to claim 97, wherein said coated surface exhibits a reduction in friction compared to the uncoated surface when each are wetted with water.

99. The object according to claim 98, wherein said coated surface retains its lubricity after repeated moistening and drying cycles.

100. The object according to claim 98, wherein said lubricious surface has a reduction in friction of about 95% when wet compared to the uncoated surface.

101. The object according to claim 96, wherein said metal or metal alloy is made of a metal or metal alloy selected from the group consisting of aluminum, magnesium, beryllium, iron, zinc, carbon steel, stainless steel, nickel, nickel-cobalt, chromium, titanium, tantalum, rare earth metal, silver, gold, platinum, tungsten, vanadium, cupper, brass, bronze and combinations thereof.

102. The object according to claim 96, wherein said plastic is a material selected from the group consisting of transparent or non-transparent polyurethane, polycarbonate, polyethers, polyesters, polyvinyl chloride, polystyrene, polyethylene, polyvinyl acetate, silicone rubbers, rubber latex, polyester-polyether copolymers, ethylene methacrylates, polyphthalates, silicone; natural and synthetic rubbers, nylon, polyamide, fluorinated-plastic materials thereof and combinations thereof.

103. The object according to claim 102, wherein said plastic is polycarbonate and wherein said coated object can be recycled without yellowing, when 30% recycled material of said object is combined with 70% virgin polycarbonate and the combination is recycled.

104. The object according to claim 96, wherein said glass is selected from the group consisting of optical glasses, optical lenses, polarizing glasses, mirrors, optical mirrors, prisms, quartz glass and ceramics.

105. The object according to claim 96, wherein said hydrophilic coating prevents the formation of water droplets on the surface of the metal, metal alloy, plastic or glass object and provides the surface of the objects with anti-fog, anti-glare and lubricious properties.

106. The object according to claim 96, wherein the object having a metal or metal alloy surface includes freezer doors, green house construction, mirrors, condenser pipes, cooling plates, cooling fins, ship hulls, underwater vehicles, underwater projectiles or airplanes.

107. The object according to claim 96, wherein the object having a plastic surface includes face shields, helmet shields, swim goggles, surgeon face shields, food packaging plastic foil, greenhouse walls, greenhouse roofs, mirrors, wind shields, underwater moving objects, airplane window shields or passenger air-balloons.

108. The object according to claim 96, wherein the object having a glass surface includes window glasses, greenhouse glasses, glass sheets, face shields, optical glasses, optical lenses polarizing glasses, mirrors, optical mirrors, prisms, quartz glass, parabolic antennas, automobile head beam light glasses, automobile windshields, airplane control light glasses or runway lights.

109. The object according to claim 95, wherein said hydrophilic coating is formed by applying said aqueous coating composition to the surface of said object by dipping, brushing, roller-coating, flooding, spraying, electrolytic depositing, electrostatic spraying, electroplating, vacuum treatment, pressure treatment or combination thereof.

110. The object according to claim 95, wherein said hydrophilic coating is directly coated on said at least one surface of said object.

111. The object according to claim 95, wherein said at least one surface of said object is coated with a primer and said hydrophilic coating is directly coated on said primer.

112. The object according to claim 72, wherein said colloidal metal oxide is selected from the group consisting of an aluminate, silicate, titanate, zincate, stannate, argentite, aluminum silicate, aluminum titanate, zirconate, zircoaluminate and a combination thereof.

113. The object according to claim 95, wherein them multifunctional crosslinker is a multifunctional compound of a type selected from the group consisting of aziridine, carbodiimide, oxirane, alcohol, glycydyl ether, glycidyl ester, carboxyl acid, amine, epoxide, vinyl sulfone, amide, allyl, prepolymeric resins of said multifunctional compounds and combinations thereof.

114. The object according to claim 95, wherein the coating composition further comprises an auxiliary agent selected from the group consisting of a surfactant, a wetting agent, an emulsifier, a dye, pigment, colorant, UV absorber, radical scavenger, anti-oxidant, anti-corrosion agent, optical brightener, fluorescers, bleaches, bleach activators, bleach catalysts, non-activated enzymes, enzyme stabilizing systems, chelants, coating aid, metal catalyst, metal oxide catalyst, organometallic catalyst, filmforming promoter, hardener, linking accelerator, flow agent, leveling agent, defoaming agent, lubricant, matte particle, rheological modifier, thickener, conductive or non-conductive metal oxide particle, magnetic particle, anti-static agent, pH control agents, perfumes, biocide, pesticide, anti-fouling agent, antimicrobial agent, aligicide, bactericide, germicides, disinfectant, fungicide, bio-effecting agent, vitamin, drug, therapeutic agent and a combination thereof.

115. The object according to claim 95, wherein the hydrophilic water-soluble organic monomer, oligomer, prepolymer, polymer or copolymer concentration is from about 0.25% to about 10% by weight.

116. The object according to claim 95, wherein the multifunctional aqueous colloidal metal oxide concentration is from about 0.25% to about 20% by weight.

* * * * *

UNITED STATES PATENT AND TRADEMARK OFFICE

CERTIFICATE OF CORRECTION

PATENT NO. : 7,008,979 B2

APPLICATION NO. : 10/260823

DATED : March 7, 2006

INVENTOR(S) : Thomas C. Schottman et al.

It is certified that error appears in the above-identified patent and that said Letters Patent is hereby corrected as shown below:

In Column 39, line 32: now reads “multifunctional aziridine is”

should read --multifunctional aziridine compound is--

Signed and Sealed this

Third Day of October, 2006

JON W. DUDAS

*Director of the United States Patent and Trademark Office*